(12) United States Patent
Mayor et al.

(10) Patent No.: US 11,659,449 B2
(45) Date of Patent: May 23, 2023

(54) MACHINE LEARNING-BASED NETWORK ANALYTICS, TROUBLESHOOT, AND SELF-HEALING HOLISTIC TELEMETRY SYSTEM INCORPORATING MODEM-EMBEDDED MACHINE ANALYSIS OF MULTI-PROTOCOL STACKS

(71) Applicant: Beegol Corporation, Sao Paulo (BR)

(72) Inventors: Gilberto Mayor, Sao Paulo (BR); Ícaro C. Dourado, Sao Paulo (BR)

(73) Assignee: Beegol Corporation, Sao Paulo (BR)

( * ) Notice: Subject to any disclaimer, the term of this patent is extended or adjusted under 35 U.S.C. 154(b) by 0 days.

(21) Appl. No.: 17/576,574

(22) Filed: Jan. 14, 2022

(65) Prior Publication Data
US 2022/0141715 A1 May 5, 2022

Related U.S. Application Data

(63) Continuation-in-part of application No. 16/944,682, filed on Jul. 31, 2020, now Pat. No. 11,356,335.

(51) Int. Cl.
| | | |
|---|---|---|
| *H04W 28/24* | (2009.01) | |
| *G06N 20/00* | (2019.01) | |
| *H04L 41/5074* | (2022.01) | |
| *H04W 24/02* | (2009.01) | |

(52) U.S. Cl.
CPC ............ *H04W 28/24* (2013.01); *G06N 20/00* (2019.01); *H04L 41/5074* (2013.01); *H04W 24/02* (2013.01)

(58) Field of Classification Search
CPC .... H04L 41/145; H04L 41/5009; H04L 43/04
See application file for complete search history.

*Primary Examiner* — William G Trost, IV
*Assistant Examiner* — Christopher P Cadorna
(74) *Attorney, Agent, or Firm* — Invent Capture, LLC.; Samuel S. Cho

(57) ABSTRACT

A novel machine learning-based network analytics, troubleshoot, and self-healing holistic telemetry system is configured to perform modem-embedded machine analysis of multi-protocol stacks (e.g. OSI model stacks) simultaneously from one integrated coherent diagnostic system alone, and identify sources of data network problems autonomously within an entire end-to-end network topology of a network operator, while not necessitating human diagnosis of the data network problems. This system uniquely embeds a smart universal telemetry (SUT) as a quality-of-experience (QoE) parameter collection agent in intermediary transport-level network equipment and each end-user modem, which in turn enables periodic or on-demand collection of robust diagnostic data from all end-user modems and intermediary transport level nodes in a data network. By executing a machine learning (ML)-based artificial intelligence (AI) analytical module in a cloud-computing resource, the system then achieves autonomous identification and source pinpointing of network problems, and in some cases, self-repairs machine-identified data network problems autonomously.

8 Claims, 18 Drawing Sheets

An Overall Process Flow Diagram for a Machine Learning-Based Network Analytics, Troubleshoot, and Self-Healing Holistic Telemetry System An Overall Process Flow Diagram for a Machine Learning-Based Network Analytics, Troubleshoot, and Self-Healing Holistic Telemetry System

100

Main Components of the Machine Learning-Based Network Analytics, Troubleshoot, and Self-Healing Holistic Telemetry System

200

An Example of Modem-Embedded and/or Other Device-Embedded SUTs in Various Nodes of a Data Network in the Holistic Telemetry System

300

End User Modem-Embedded Collection Agents and Network Transport-Level Collection Agents as SUTs Embedded in Various Network Nodes in the Holistic Telemetry System A Network Transport-Level Problem Identification Example by the AI Analytical Module in the Holistic Telemetry System

500

An Autonomous Diagnostic Process Flow with an AI Refinement Feedback Loop in the Machine Learning-Based Network Analytics, Troubleshoot, and Self-Healing Holistic Telemetry System

600

An Example of a QoE Analysis for a One-Day Measurement Window Performed by the Machine Learning-Based Network Analytics, Troubleshoot, and Self-Healing Holistic Telemetry System

700

$$\text{QoE} = \sum_{i=1}^{3} W_i Z_i \text{ where } Wi = \frac{1}{3} \text{ and } Z_i \text{ is given by } \begin{cases} \cdot \ 1: \text{KPI Score} \\ \cdot \ 2: \text{Severity Score} \\ \cdot \ 3: \text{Frequency Score} \end{cases}$$

Problem Score — 801

An Example of a QoE Analysis for a Three-Day Measurement Window Performed by the Machine Learning-Based Network Analytics, Troubleshoot, and Self-Healing Holistic Telemetry System

An Example of QoE Improvement Priority Rules Determined from One-day and Three-day Measurement Window QoE Problem Alerts

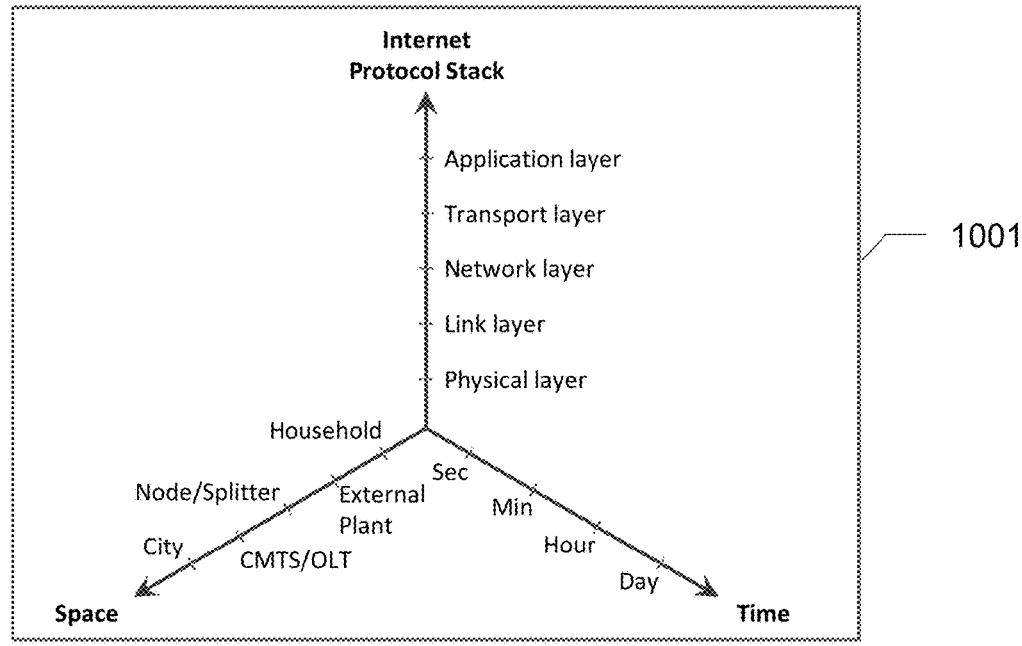
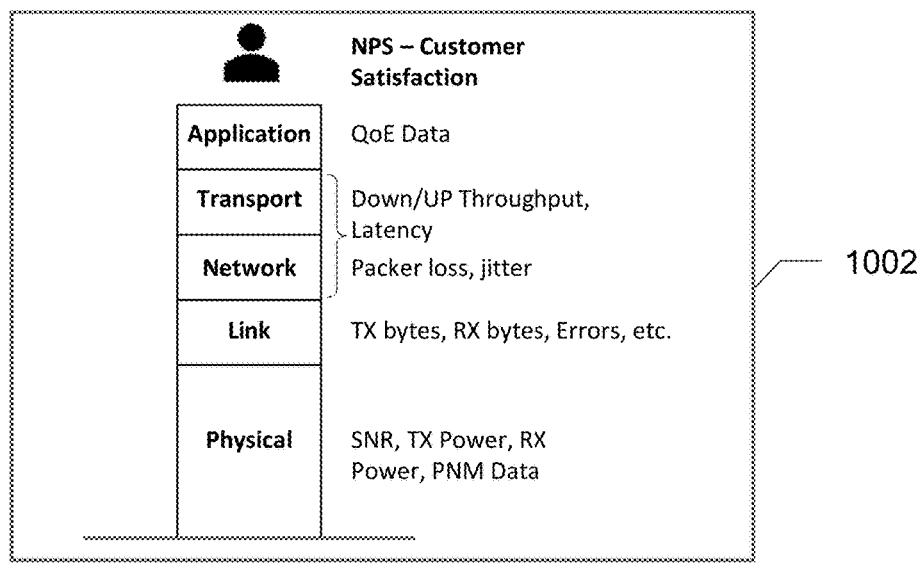
Multi-Dimensional Holistic Network Diagnostic Capabilities Provided by the Machine Learning-Based Network Analytics, Troubleshoot, and Self-Healing Holistic Telemetry System
FIG. 10

| | KPI's | Type | Granularity |
|---|---|---|---|
| Application | QoE | Bad video quality<br><br>A problem is defined when the QoE is below a given acceptable threshold | Per Application |
| Transport | QoS = f (Mi)<br><br>DL / UL throughput: < 80%<br>Latency: > 50 ms<br>Jitter: > 20 ms<br>Packet loss > 0,01% | DOCSIS Metrics (Mi)<br><br>A problem is defined when a QoS is below a given acceptable threshold | Per technology (DOCSIS / GPON / Mobile) |
| Network | -DNS problems<br>-CDN problems / Gamer Servers Problems<br>-Transport / congestion problem | | |
| Link | -Wi-Fi problems  ⟶  -Coverage problem / -Channel interference / -Device problem<br>-DOCSIS problems → Modem, High utilization | | |
| Physical | -Access problem  ⟶  -Modem / -Internal Wiring / -External Plant / -Node/Splitter / -CMTS/OLT | | |

Simultaneous Multi-Layer Problem Detection in an OSI Model by the Machine Learning-Based Network Analytics, Troubleshoot, and Self-Healing Holistic Telemetry System

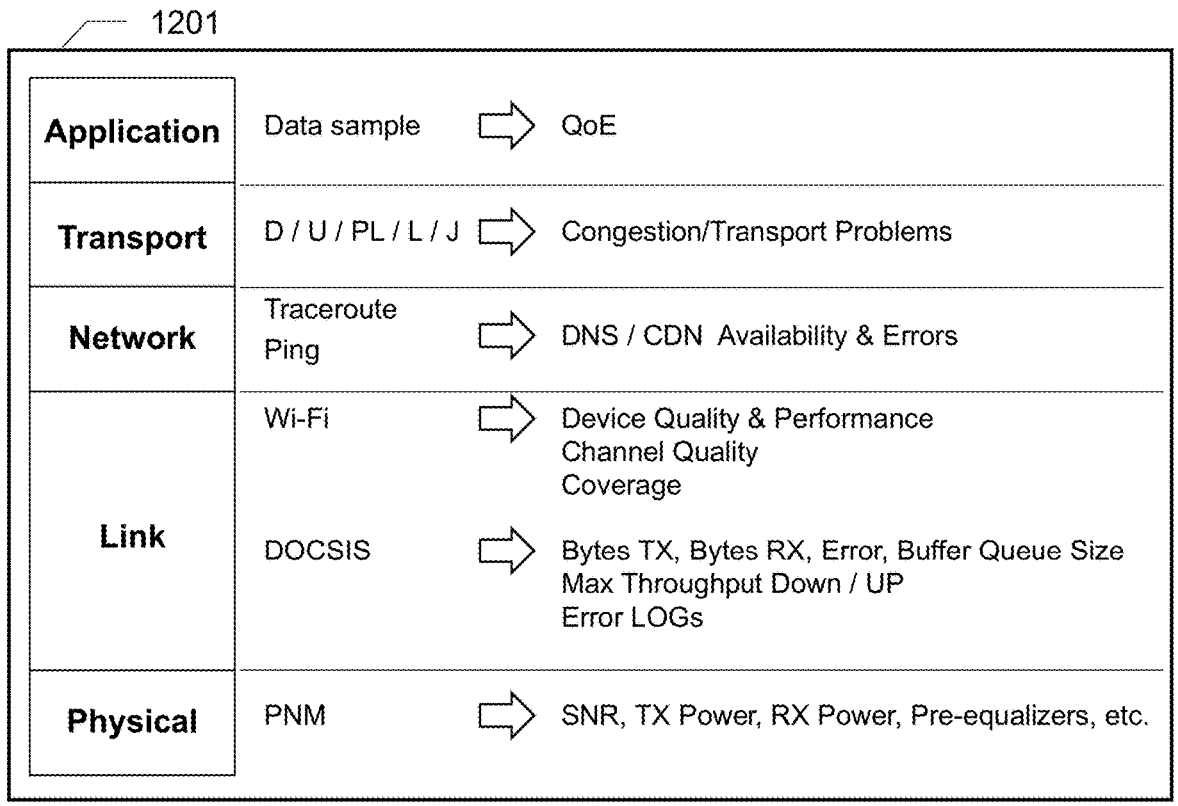
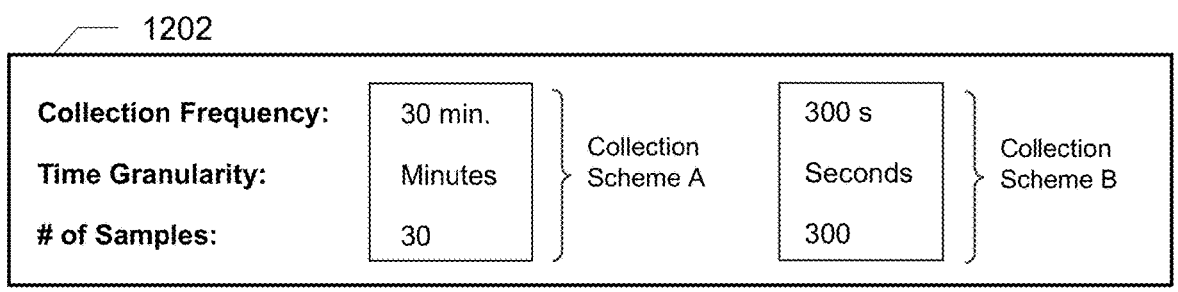
A Simultaneous Multi-Layer Data Collection Process Example by the Machine Learning-Based Network Analytics, Troubleshoot, and Self-Healing Holistic Telemetry System
1200
FIG. 12

1301

| Command Types | Command Example |
|---|---|
| 1. Regular Frequency | -Measure download/upload at each 6 hours |
| 2. Programmable | -Measure latency each second for 1 minute when there is potential congestion. Run traceroute |
| 3. On-Demand Real-time | -Measure upload now<br>-Get Wi-Fi data now – which devices are connected in the home now |
| 4. New Scripts | -Restart modem.<br>-Change Wi-Fi channel |
| 5. Time Series | -Can get KPIs from the modem and other time-series |

Network Diagnostic Command Types and Examples in the Machine Learning-Based Network Analytics, Troubleshoot, and Self-Healing Holistic Telemetry System

| Command Parameter Example ||
|---|---|
| Head | Communication protocol |
| ID | MAC address of the model |
| Command Number | Unique number within a MAC |
| SQ | Sequence |
| Command | Chooses which command to execute |
| Command Type | Type of Comand |
| TGranularity | Time Granurarity |
| IP/DNS | Defines several measurement server's IP |
| Tresp | Defines if the response should be sent after the execution of each command or at regular time intervals |
| CK | Checksum |
| Privacy Mode | Defines privacy mode, 0=no privacy, 1: encrypts MAC address, 2: strip out MAC address |
| Command Priority | Command priority when collision happens |

An Example of Command Parameters for the Machine Learning-Based Network Analytics, Troubleshoot, and Self-Healing Holistic Telemetry System

An Example of Command Structure for the Machine Learning-Based Network Analytics, Troubleshoot, and Self-Healing Holistic Telemetry System An ML and SUT Agent Interaction Diagram for the Machine Learning-Based Network Analytics, Troubleshoot, and Self-Healing Holistic Telemetry System

1600

A Command and Dataflow Architectural Diagram for the Machine Learning-Based Network Analytics, Troubleshoot, and Self-Healing Holistic Telemetry System

1700

Activation and Data Collection Process for the Machine Learning-Based Network Analytics, Troubleshoot, and Self-Healing Holistic Telemetry System

1800

MACHINE LEARNING-BASED NETWORK ANALYTICS, TROUBLESHOOT, AND SELF-HEALING HOLISTIC TELEMETRY SYSTEM INCORPORATING MODEM-EMBEDDED MACHINE ANALYSIS OF MULTI-PROTOCOL STACKS

BACKGROUND OF THE INVENTION

The present invention generally relates to one or more electronic systems for data network problem identifications and repairs. More specifically, various embodiments of the present invention relate to autonomous machine-determined network analytics, troubleshoot, and self-healing holistic telemetry systems that utilize artificial intelligence with a machine learning feedback loop for continuous refinements and improvements to network problem identifications and autonomous repair processes. Furthermore, various embodiments of the present invention also relate to methods of operating such autonomous machine-determined network analytics, troubleshoot, and self-healing holistic telemetry systems. In addition, various embodiments of the present invention relate to such autonomous machine-determined network analytics, troubleshoot, and self-healing holistic telemetry systems that also incorporate modem-embedded machine analysis of multi-protocol stacks.

Today's Internet service providers (ISPs) and telecommunication operators confront a daunting task of resolving persistent cases of various data network service interruptions, congestions, and equipment failures in their vast data networks and service areas. Data network service interruptions, spotty connections, unintended throughput reductions, and sudden equipment failures adversely impact a subscriber's "quality of experience" (QoE), which is an end user-oriented metric of the quality of communication experience through a particular data network. Because low QoE satisfaction rates are positively correlated to customer churn and defection rates, many ISPs and telecommunication operators typically allocate a large team of support personnel dedicated to network problem troubleshooting and a correspondingly-large operating budget for such human-staffed troubleshoot tasks.

Unfortunately, conventional computerized network problem diagnostic solutions utilized by ISPs and telecommunication operators require significant human staff interventions in trial-and-error manualized troubleshooting processes, because conventional network diagnostic tools are typically only capable of detecting a limited number of problems at intermediary broadband nodes and major network access points. For example, conventional broadband diagnostic methods utilize static and regular time-interval for data collection and are limited to using remote protocols such as TR-069 and TR183, which restrict data collection to each protocol's specifications. The types of network health data specified by TR-069 and TR183 protocol standards, which may be transmitted to a network operator at regular time intervals, are insufficient to provide a complete real-time topology of the health of various network nodes, let alone the health of individual on-premise customer network equipment.

In the current state of the art in resolving customer complaints for alleged network problems, it is customary to use trial-and-error and process-by-elimination methods by a human repair staff, who is tasked with probing various network nodes and customer on-premise equipment in a manualized and time-consuming process until a culprit is identified. In many instances, this manualized and time-consuming process for identifying and resolving network problems and customer QoE complaints involves misplaced or repeated visits by a repairman to alleged sources of network problems.

Such inefficient and manualized data network troubleshooting procedures inherently cause a significant time lag between a customer's initial complaint and a satisfactory resolution to the alleged network problem, which in turn impacts the overall QoE metric more negatively. This also implies that under the current state of the art for network troubleshooting, any short-staffed network operators for repair personnel are likely to score low on QoE measures. Furthermore, the manualized data network troubleshooting procedures in the current state of the art necessitate high costs of human staffing and labor, due to the time-consuming and inefficient nature of human-driven trial-and-error and process-by-elimination methods employed by the field staff.

Furthermore, conventional computerized network problem diagnostic solutions utilized by ISPs and telecommunication operators require separate or disparate procedures for diagnosing and monitoring different layers of a data network. For example, conventional diagnostic tools may be separated or specialized for different levels of open systems interconnection (OSI) model. Some conventional diagnostic tools may be monitoring lower-level OSI layers (e.g. physical and link layers), while other tools are focused on middle-level OSI layers (e.g. network and transport layers) or user-level application layers. With conventional diagnostic solutions, the burden of figuring out which OSI layer is causing a network service interruption or a slowdown is often a time-consuming and manualized investigative process, which is also dependent upon quality and experience of a human operator performing such diagnostics evaluations.

Therefore, it may be desirable to devise a novel electronic system for identifying and locating sources or causes of data network problems autonomously within an entire end-to-end network topology of a network operator, while not necessitating human diagnosis of the data network problems.

Moreover, it may also be desirable to devise a novel electronic system and a related operating method capable of monitoring and evaluating potential data network service quality problems holistically with just one integrated diagnostic system by performing modem-embedded machine analysis of multi-protocol (e.g. OSI layer) stacks simultaneously. It may also be desirable to provide a capability to request additional data automatically from one or more modems to increase the diagnostic accuracy.

Furthermore, it may also be desirable to devise a novel electronic system that autonomously heals data network-related problems within an entire end-to-end network topology of a network operator, whenever situations merit software-based automated network repairs.

In addition, it may also be desirable to devise a method for operating a novel electronic system for identifying, locating, and self-healing sources or causes of data network problems autonomously within an entire end-to-end network topology of a network operator, while not necessitating human diagnosis of the data network problems.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a method for operating a machine learning-based network analytics, troubleshoot, and self-healing holistic telemetry system, which incorporates modem-embedded machine analysis of multi-protocol stacks, is disclosed. This method comprises the steps of: (1) colleting end-user quality-of-experience (QoE) parameters from a modem-embedded smart universal telemetry (SUT) module executed with a modem device firmware in an end-user modem, wherein the end-user modem is a service provider's on-premise network equipment that further connects to end users' personal and mobile computing devices; (2) collecting broadband diagnostic datasets from a broadband measurement server; (3) collecting wireless local area network (LAN)-related diagnostic datasets from a wireless LAN measurement server, wherein each of the modem-embedded SUT module, the broadband measurement server, and the wireless LAN measurement server is connected to an operator's wide-area data network, and wherein the end-user QoE parameters, the broadband diagnostic datasets, and the wireless LAN-related diagnostic datasets comprise a complete snapshot of multi-protocol stack diagnostic information; (4) converting the end-user QoE parameters, broadband diagnostic datasets, and wireless LAN-related diagnostic datasets into an input features format compatible to a machine learning (ML)-based artificial intelligence (AI) analytical module; (5) synthesizing the input features format further to include a customer profile, a network topology for the operator's wide-area data network, and additional information associated with network equipment in the operator's wide-area data network; (6) feeding the input features format into the machine learning (ML)-based artificial intelligence (AI) analytical module executed in a cloud-computing resource connected to the operator's wide-area data network; (7) identifying and locating a network QoE problem from the machine learning (ML)-based artificial intelligence (AI) analytical module; (8) calculating a QoE problem score by categorizing traits, origins, and characteristics of the network QoE problem into three particular performance parameters comprising a total number of impacted key performance indicators (KPIs), severity of the network QoE problem, and frequency of the network QoE problem, wherein the impacted KPIs integrate download, upload, latency, packet loss, and jitter measurements from the modem-embedded SUT module to the operator's wide-area data network; and (9) generating and displaying a resolution strategy autonomously from the machine learning (ML)-based artificial intelligence (AI) analytical module and resolving the network QoE problem within the operator's wide-area data network.

BRIEF DESCRIPTION OF DRAWINGS

FIG. 8 shows an example of a QoE analysis for a three-day measurement window performed by the machine learning-based network analytics, troubleshoot, and self-healing holistic telemetry system, in accordance with an embodiment of the invention.

FIG. 10 shows conceptual diagrams for multi-dimensional holistic network diagnostic capabilities provided by the machine learning-based network analytics, troubleshoot, and self-healing holistic telemetry system, which incorporates modem-embedded machine analysis of multi-protocol stacks, in accordance with an embodiment of the invention.

FIG. 11 shows an example of simultaneous multi-layer problem detection in an OSI model by the machine learning-based network analytics, troubleshoot, and self-healing holistic telemetry system, which incorporates modem-embedded machine analysis of multi-protocol stacks, in accordance with an embodiment of the invention.

FIG. 12 shows a simultaneous multi-layer data collection process example by the machine learning-based network analytics, troubleshoot, and self-healing holistic telemetry system, which incorporates modem-embedded machine analysis of multi-protocol stacks, in accordance with an embodiment of the invention.

FIG. 13 shows network diagnostic command types and examples in the machine learning-based network analytics, troubleshoot, and self-healing holistic telemetry system incorporating modem-embedded machine analysis of multi-protocol stacks, in accordance with an embodiment of the invention.

FIG. 14 shows an example of command parameters for the machine learning-based network analytics, troubleshoot, and self-healing holistic telemetry system incorporating modem-embedded machine analysis of multi-protocol stacks, in accordance with an embodiment of the invention.

DETAILED DESCRIPTION

Figure 1:
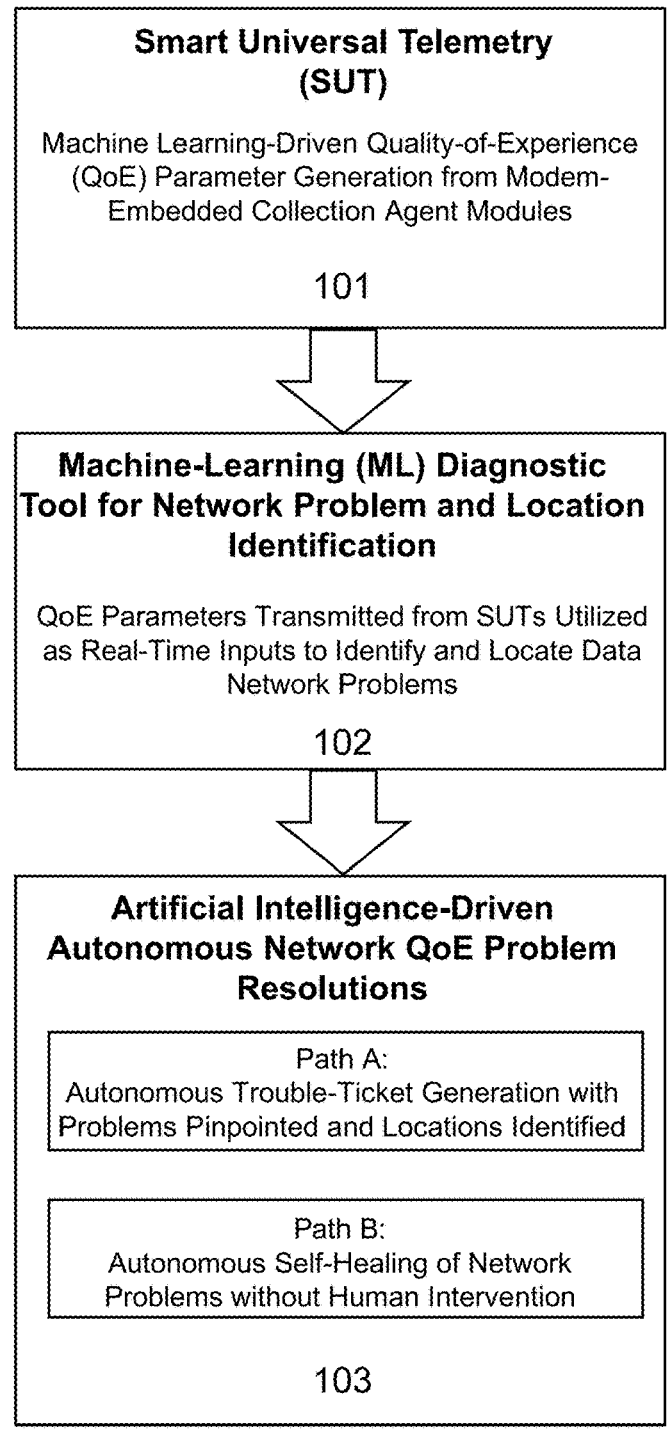
FIG. 1 shows an overall process flow diagram for a machine learning-based network analytics, troubleshoot, and self-healing holistic telemetry system, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more novel machine learning-based network analytics, troubleshoot, and self-healing holistic telemetry systems and methods of operating thereof. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order nor imply any limitations in the invention.

For the purpose of describing the invention, a term herein referred to as "autonomous," or "autonomously" is defined as machine-initiated and machine-determined without resorting to or relying on a human operator's manual decisions.

Furthermore, for the purpose of describing the invention, a term herein referred to as "quality of experience," or "QoE," is defined as a measure of a data network subscriber's satisfaction with a data network service by an Internet service provider or a telecommunications operator. The data network subscriber in context of QoE measurements is typically an "end-user" customer with one or more electronic devices connected to the Internet, a local area network (LAN), a broadband network, and/or other data networks. In general, QoE is positively correlated to uninterrupted and speedy data network operations and negatively correlated to frequent network disruptions, sluggish network speeds, sudden network equipment failures, and slow repair processes, because a typical end-user customer values a reliable and speedy network service and dislikes network downtimes, congestions, and equipment breakdowns. Furthermore, it is also correlated to the experience given by the Wifi connection at home or office environment.

In addition, a term herein referred to as a "smart universal telemetry," or an "SUT," is defined as a QoE data parameter collection agent module embedded in an end-user modem or in another network equipment within various transport nodes of a data network. Typically, the QoE parameter collection agent module is configured to gather and transmit subscriber modem-originating diagnostic data parameters to a network operator's machine-learning diagnostic tool on an on-demand or periodic basis for network QoE problem discoveries and location identifications, or in some cases, driven by specific events, which are autonomously performed by the machine-learning-based network analytics, troubleshoot, and self-healing holistic telemetry system. In a preferred embodiment of the invention, the SUT is an embedded QoE parameter collection software integrated into a modem communications chipset that also stores the modem's firmware. In another embodiment of the invention, the SUT may be a combination of a sensor device and an embedded QoE parameter collection software integrated into a modem.

Moreover, for the purpose of describing the invention, a term herein referred to as "computer server" is defined as a physical computer system, another hardware device, a software module executed in an electronic device, or a combination thereof. Furthermore, in one embodiment of the invention, a computer server is physically or wirelessly connected to one or more data networks, such as a local area network (LAN), a wide area network (WAN), a cellular network, and the Internet. Moreover, a group of computer servers may be flexibly scaled up or down to constitute a cloud computing network to process large volumes of network and device diagnostics data and to execute a machine learning-based network analytics, troubleshoot, and self-healing holistic telemetry system for automated QoE improvements.

One aspect of an embodiment of the present invention is providing a novel electronic system for identifying and locating sources or causes of data network problems autonomously within an entire end-to-end network topology of a network operator, while not necessitating human diagnosis of the data network problems.

Another aspect of an embodiment of the present invention is providing a novel electronic system and a related operating method capable of monitoring and evaluating potential data network service quality problems holistically with just one integrated diagnostic system by performing modem-embedded machine analysis of multi-protocol (e.g. OSI layer) stacks simultaneously.

Another aspect of an embodiment of the present invention is providing a novel electronic system that autonomously heals data network-related problems within an entire end-to-end network topology of a network operator, whenever situations merit software-based automated network repairs.

Yet another aspect of an embodiment of the present invention is providing a novel electronic system that autonomously generates trouble tickets for physical repairs without human diagnostic interventions, wherein each trouble ticket pinpoints problems and identifies problem locations autonomously by utilizing a machine-learning diagnostic tool that monitors an entire end-to-end network topology of a network operator, including individual end-user modems.

Yet another aspect of an embodiment of the present invention is providing a method for operating a novel electronic system for identifying, locating, and self-healing sources or causes of data network problems autonomously within an entire end-to-end network topology of a network operator, while not necessitating human diagnosis of the data network problems.

FIG. 1 shows an overall process flow diagram (100) for a novel machine learning-based network analytics, troubleshoot, and self-healing holistic telemetry system, in accordance with an embodiment of the invention. In a preferred embodiment of the invention, a smart universal telemetry (SUT), which is particularly designed for the machine learning-based network analytics, troubleshoot, and self-healing holistic telemetry system as a "collection agent," is incorporated into each end-user modem as an embedded software loaded onto a modem's circuit board. Typically, the SUT is machine-coded into a modem's communications chipset that also integrates its device firmware. In some instances, the SUT may instead be stored in a flash memory or a hard drive within the modem's casing, and dynamically loaded into a CPU/APU and a memory unit of the modem as modem diagnostic data collections are invoked by the machine learning-based network analytics, troubleshoot, and self-healing holistic telemetry system.

As shown in the first step (101) of the overall process flow diagram (100) for the machine learning-based network analytics, troubleshoot, and self-healing holistic telemetry system, the SUT functions as an end-user modem diagnostic dataset collection agent, and is configured to generate and transmit quality-of-experience (QoE) parameters to a machine-learning diagnostic tool operating from a cloud computing resource for network QoE problem and location identification. Examples of QoE parameters include, but are not limited to, network latency, jitter, download speed, upload speed, packet loss, quality of signal, users/device statistics, site survey, and hardware malfunction indicators. By directly embedding an SUT into each end-user modem, the machine learning-based network analytics, troubleshoot, and self-healing holistic telemetry system is able to monitor and diagnose all nodes, splitters, and terminals of a data network in real time under its autonomous machine supervision, which in turn enables the system to rapidly identify, locate, and resolve network QoE complaints (e.g. network downtime, sluggishness, etc.) by customers.

Furthermore, the modem-embedded smart universal telemetry (SUT) is easily scalable to millions of modems and can be flexibly utilized through the machine-learning diagnostic tool executed in a cloud-computing resource (e.g. one or more cloud network-connected scalable servers), which is also configured to improve accuracy and effectiveness of its autonomous QoE problem detection and location identification capabilities through an artificial intelligence (AI) refinement feedback loop provided by the big-data machine learning over an extended operational period. In the preferred embodiment of the invention, SUT-embedded modems are deployed in one or more combinations of cable modem networks, fiber optic networks, and digital subscriber line (e.g. DSL, VDSL) network environments. Moreover, a modem-embedded software that constitutes the SUT may be flexibly and dynamically updated over the air by the machine learning-based network analytics, troubleshoot, and self-healing holistic telemetry system to refine or edit diagnostic data collection capabilities from each targeted end-user modem.

As shown in the second step (102) of the overall process flow diagram (100) for the machine learning-based network analytics, troubleshoot, and self-healing holistic telemetry system, the ML diagnostic tool for network QoE problem and location identification is able to collect and analyze numerous network diagnostic parameters in the entire end-to-end topology of a data network it supervises, including all end-user modems and all intermediary transport nodes and related network equipment (e.g. routers, network servers, splitters, switches, etc.). By incorporating SUTs in all end-user modems and all intermediary transport nodes of the data network, the ML diagnostic tool for network QoE problem and location identification is able to capture and diagnose a complete end-to-end operating and functional snapshot of the data network in real time, which in turn enables rapid and autonomous QoE problem and location identifications even without a human operator intervention in many instances, as shown in the second step (102) of the overall process flow diagram (100).

In the preferred embodiment of the invention, the machine-learning (ML) diagnostic tool is a software module executed in a cloud-computing resource (e.g. one or more cloud network-connected scalable servers). The ML diagnostic module is also configured to improve accuracy and effectiveness of its autonomous QoE problem detection and location identification capabilities through an artificial intelligence (AI) refinement feedback loop provided by the big-data machine learning over an extended operational period, wherein the big data is an accumulation of various QoE parameters originating from end-user modems and intermediary transport-level network nodes. Furthermore, in the preferred embodiment of the invention, the ML diagnostic tool operating from the cloud-computing resource to monitor and identify QoE problems can coexist with legacy systems and conventional diagnostic tools within the data network, thus simplifying operational management of the data network by an ISP or another telecommunications service provider.

Once the ML diagnostic tool autonomously discovers QoE problems and pinpoints the source of such QoE problems originating from an equipment failure within an intermediary transport node, a splitter, an end-user modem, a data line disconnection, a power outage in a certain region, etc., the machine learning-based network analytics, troubleshoot, and self-healing holistic telemetry system utilizes artificial intelligence to follow one of the two pathways autonomously (i.e. without human operator interventions) to resolve QoE problems, as shown in the third step (103) in the overall process flow diagram (100).

The first path (i.e. "Path A") involves an autonomous trouble-ticket generation with problems pinpointed and locations identified by the machine learning-based network analytics, troubleshoot, and self-healing holistic telemetry system without human operator interventions. Once a trouble ticket is generated, a human repair technician can use the autonomous machine-identified QoE problem descriptions, problem source location information, and recommended repair actions to perform an onsite repair, a customer premise visit for an equipment replacement or repair, or another action to resolve the QoE problems as rapidly and efficiently as possible. For the machine learning-based network analytics, troubleshoot, and self-healing holistic telemetry system, this first path (i.e. "Path A") may be an optimal solution for resolving network QoE problems that require physical repairs or replacement of parts, equipment, and/or connections, instead of software-based online repair actions.

On the other hand, as also shown in the third step (103) in the overall process flow diagram (100) in FIG. 1, the second path (i.e. "Path B") involves an autonomous self-healing of network QoE problems without human repair technician interventions. The autonomous self-healing approaches for QoE problem resolutions are particularly ideal if a network congestion or a disconnection can be resolved by taking a software-based online repair action to a machine-identified source of the QoE problem. Examples of such software-based online repair actions include, but are not limited to, changing a wireless LAN channel in an end-user modem, rebooting a network equipment, and/or reinstalling a piece of software in a device identified as the source of the network QoE problem.

Compared to conventional human-intensive and manual trial-and-error diagnostic processes, either pathways (i.e. "Path A," or "Path B") from the artificial intelligence-driven autonomous network QoE problem resolutions executed by the machine learning-based network analytics, troubleshoot, and self-healing holistic telemetry system are significantly faster, cheaper, and more accurate in resolving customer QoE complaints for alleged network congestions, downtimes, or equipment failures. Therefore, the machine learning-based network analytics, troubleshoot, and self-healing holistic telemetry system, as disclosed in various embodiments of the present invention, enables more efficient and accurate resolutions to customer QoE complaints, which in turn improves customer satisfaction and retention rates. Furthermore, the autonomous nature of the machine learning-based network analytics, troubleshoot, and self-healing holistic telemetry system reduces wasted time, efforts, and manpower to resolve network QoE problems, thus contributing to a network provider's operational cost savings and efficiencies.

Figure 2:
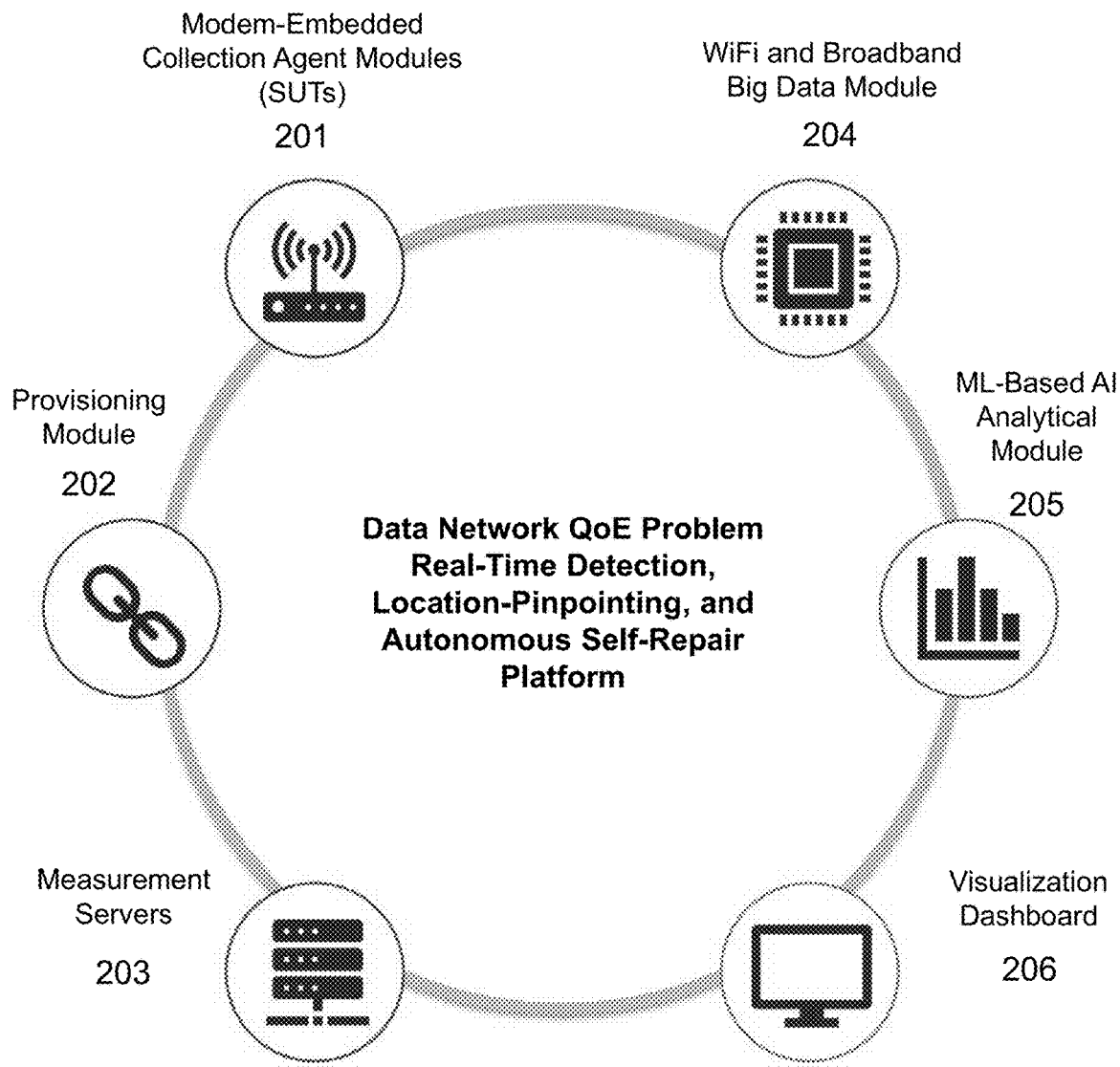
FIG. 2 shows main components of the machine learning-based network analytics, troubleshoot, and self-healing holistic telemetry system, in accordance with an embodiment of the invention.

FIG. 2 shows main components (200) of the machine learning-based network analytics, troubleshoot, and self-healing holistic telemetry system, in accordance with an embodiment of the invention. The machine learning-based network analytics, troubleshoot, and self-healing holistic telemetry system comprises a modem-embedded collection agent module (i.e. also called interchangeably herein as a "smart universal telemetry" (SUT)) (201), a provisioning module (202), a measurement server (203), a wireless LAN and broadband big-data module (204), a machine learning (ML)-based artificial intelligence analytical module (205), and a visualization dashboard interface (206), as illustrated in FIG. 2. When operatively connected together, these main components (201, 202, 203, 204, 205, 206) of the machine learning-based network analytics, troubleshoot, and self-healing holistic telemetry system constitute a data network quality-of-experience (QoE) problem detection, location-pinpointing, and autonomous self-repair platform, as shown in FIG. 2.

In a preferred embodiment of the invention, each of the modem-embedded collection agent module (201) incorporates several logical sub-blocks, such as a wireless LAN (i.e. WiFi) data collector, a broadband data collector, a collection transfer agent unit, and a communication broker unit. On the one hand, the wireless LAN data collector in the modem-embedded collection agent module (201) is responsible for gathering all wireless LAN-related diagnostics parameters within the modem, such as the quality of WiFi signals, users and device statistics, and wireless access point site surveys. On the other hand, the broadband data collector in the modem-embedded collection agent module (201) is configured to accumulate passive diagnostics data related to the broadband network, while also actively measuring performance characteristics against servers in the data network. The broadband data collector may passively capture, actively measure, and accumulate real-time broadband network characteristics, such as network latency, jitter, download speed, upload speed, packet loss, and other physical layer variables (e.g. RX power, TX power, RX SNR, ICFR). The broadband module also includes a Proactive Network Management (PNM) module as defined by cable labs protocol In addition, in the preferred embodiment of the invention, the modem-embedded collection agent module (201) may also collect other diagnostic parameters, such as modem's internal performance data (e.g. executed modem instructions, memory usage, number of resets/reboots) and time-series data (e.g. Domain Name System (DNS) queries, session data, transport control protocol (TCP) data) to provide a comprehensive real-time and on-demand diagnostic snapshot to the machine learning-based artificial intelligence analytical module (205) in the machine learning-based network analytics, troubleshoot, and self-healing holistic telemetry system. The modem-embedded collection agent module (201) is designed to be incorporated into each of all end-user modems that are connected to the data network operated by a network service provider. In the preferred embodiment of the invention, the modem-embedded collection agent module (201) is incorporated into an end-user modem, and operates with a modem device firmware as part of a modem-embedded software suite.

In some cases, the modem-embedded collection agent module (201) is machine-coded directly into an embedded system chip for hardware-based operation. In other cases, the modem-embedded collection agent module (201) resides in a non-volatile data storage, such as a Flash memory unit or a hard disk, and is executed by a modem application processor unit (APU) or another logical execution unit as needed. Importantly, the modem-embedded collection agent module (201) is configured to accumulate and subsequently transmit end-user QoE diagnostic parameters as dynamic inputs to a wireless LAN and broadband big data module through the operator's wide-area data network. Examples of the end-user QoE diagnostic parameters include, but are not limited to, modem device operation information, modem device process information, modem memory content information, domain name system (DNS) information, and modem device-specific time-series parameters.

Continuing with the embodiment of the invention as illustrated in FIG. 2, the collection transfer agent unit incorporated in the modem-embedded collection agent module (201) is configured to transmit the accumulated network diagnostics datasets from the wireless LAN data collector and the broadband data collector, whenever the machine learning (ML)-based artificial intelligence (AI) analytical module (205) executed in a cloud-computing resource demands transfer of collected datasets from a particular modem connected to the network. The frequency of collected data transfer may be purely on-demand, periodic, or a combination of the two, depending on a specific implementation of the machine learning-based network analytics, troubleshoot, and self-healing holistic telemetry system. Furthermore, the communication broker unit inside the modem-embedded collection agent module (201) provides a mediated data exchange among multiple data collection sub-blocks inside the modem and the ML-based AI analytical module (205).

Moreover, the provisioning module (202) is another main component of the machine learning-based network analytics, troubleshoot, and self-healing holistic telemetry system, and is responsible for initialization, registration, and housekeeping of numerous modem-embedded collection agent modules for up-to-date linking with the rest of the system components. In the preferred embodiment of the invention, the provisioning module (202) includes an initialization agent that accommodates an automated exchange of preparatory parameters between a collection agent (i.e. SUT) in a modem and a cloud-computing server operating the ML-based AI analytical module (205), when the modem undergoes a startup or reset sequence. The initialization agent in the provisioning module (202) typically sets the frequency of data collection and the initial types of diagnostic data that will be transmitted to the ML-based AI analytical module (205), when the modem comes online in the data network. The provisioning module (202) may also include a monitored device registration agent that keeps track of currently-active and inactive SUTs in end-user modems and other network equipment.

Furthermore, the measurement servers (203) are parts of the main components of the machine learning-based network analytics, troubleshoot, and self-healing holistic telemetry system, and is responsible for measuring key quality-of-service (QoS) indicators by utilizing several designated servers to evaluate end-to-end user experience. In the preferred embodiment of the invention, the measurement servers (203) include a broadband measurement sever that actively measures network performance criteria from one point (e.g. a collection agent in the modem) to another point (e.g. the broadband measurement server), and generates broadband diagnostic datasets. Examples of such broadband diagnostic datasets include, but are not limited to, latency, jitter, download speed, upload speed, and packet loss information between one node (e.g. the collection agent module in the end-user modem) and another node (e.g. the broadband measurement server) in the operator's wide-area data network. Typically, numerous broadband measurement servers are distributed along the data network to identify network bottlenecks. A network bottleneck may be identified between "Point A" and "Point B," when a broadband measurement server measuring the network performance criteria between these two points determines an unacceptable level of network congestion or an outright disconnection.

In addition, the measurement servers (203) in the machine learning-based network analytics, troubleshoot, and self-healing holistic telemetry system may also include a wireless LAN (e.g. "WiFi") measurement sever configured to collect diagnostic data from one or more wireless local area networks. In a typical network diagnostic configuration for the machine learning-based network analytics, troubleshoot, and self-healing holistic telemetry system, end-user modems connected to the wireless local area networks as well as the broadband networks transmit the WiFi-related diagnostic datasets to the wireless LAN measurement server, which is a type of the measurement servers (203), as shown in FIG. 2. Examples of WiFi or wireless LAN-related diagnostic datasets include quality of signal, site survey, user statistics, and device statistics information associated with one or more wireless LAN networks connected to the operator's wide-area data network.

Subsequently, as also shown in FIG. 2, the WiFi-related diagnostic datasets as well as broadband diagnostic datasets from the measurement servers (203) are packaged, categorized, and stored in the wireless LAN and broadband big data module (204). In the preferred embodiment of the invention, the wireless LAN and broadband big data module (204) is part of a dynamic relational database executed in a scalable number of servers in the cloud-computing resource of the machine learning-based network analytics, troubleshoot, and self-healing holistic telemetry system.

Furthermore, the machine learning (ML)-based artificial intelligence analytical module (205) is the kernel of the machine learning-based network analytics, troubleshoot, and self-healing holistic telemetry system that operates artificial intelligence and adaptive machine learning to diagnose, determine, and resolve network quality of experience (QoE) problems that typically involve network slowdowns, disconnections, or equipment failures experienced by the network's end-user customers. In the preferred embodiment of the invention, the machine learning (ML)-based artificial intelligence analytical module (205) comprises a network diagnostic data reading sub-block (e.g. 601, 602, 603 in FIG. 6), a network diagnostic analysis tool sub-block (e.g. 604 in FIG. 6), a network heuristic rules validation sub-block (e.g. 605 in FIG. 6), and a QoE problem resolution sub-block (e.g. 604 in FIG. 6).

The network diagnostic data reading sub-block (e.g. 601, 602, 603 in FIG. 6) is capable of extracting data features from the collected diagnostic datasets. Typically, collected QoE parameters from SUTs are transformed or converted to AI-compatible formats as input features to the network diagnostic analysis tool sub-block. The network diagnostic data reading sub-block may also package and prepare a customer profile, a simplified network topology dataset, a converted/transformed QoE parameters from SUTs, and any other pertinent data related to network equipment. Then, the AI-compatible converted and extracted input features processed by the network diagnostic data reading sub-block are fed into the network diagnostic analysis tool sub-block (e.g. 604 in FIG. 6), which conducts artificial intelligence machine determination of potential causes and locations of network congestions, disruptions, equipment failures, or other problems impacting end users' satisfaction with the operating quality of the data network.

During the AI machine determination of such intelligent and autonomous diagnostics process, the network diagnostic analysis tool sub-block may request more diagnostic data from a suspected source of network problems. For example, the network diagnostic analysis tool sub-block, using its first-pass AI reasoning in isolating one or more potential sources of network problems, may inquire a particular network router, a particular network switch, a particular end-user modem, or a particular intermediary server of AI's analytical interest to receive additional diagnostics data to conduct a more detailed second-pass AI analysis to confirm the source and the location of a particular network problem, and to develop a finalized autonomous recommendation (i.e. without a direct instruction or intervention from a human system operator) for resolving the identified network QoE problem.

Furthermore, the network heuristic rules validation sub-block (e.g. 605 in FIG. 6) in the machine learning (ML)-based artificial intelligence analytical module (205) conducts a basic "sanity check" against network heuristic rules pertinent to the identified network QoE problem. For instance, the network heuristic rules validation sub-block may determine an order of network repair priority for resolving multiple network QoE problems by performing sanity checks against network heuristic rules, as illustrated in a situational example (900) in FIG. 9. In another instance, the network heuristics rules validation sub-block may determine that the basic sanity check of the network heuristic rules associated with the identified network QoE problem suggests that the problem is either already resolved or falsely flagged by SUTs or other components of the system.

Moreover, the QoE problem resolution sub-block (e.g. 604 in FIG. 6) in the machine learning (ML)-based artificial intelligence analytical module (205) is configured to execute the finalized autonomous recommendation by following one of the two pathways: (1) generating a trouble ticket with the QoE problem(s) identified, described, and located to assist a physical repair by a human repairman, or (2) software-based self-healing of the identified QoE problem(s) without human repairman's intervention.

In the preferred embodiment of the invention, the machine learning (ML)-based artificial intelligence analytical module (205) is executed on a scalable number of cloud-networked computer servers, and carries out both the second step (102) and the third step (103) in the overall process flow diagram (100), which was previously described in conjunction with FIG. 1. The machine learning (ML)-based artificial intelligence analytical module (205) is able to collect and analyze numerous network diagnostic parameters in the entire end-to-end topology of a data network it supervises, including all end-user modems (e.g. SUTs represented by element 201) and all intermediary transport nodes and related network equipment (e.g. routers, network servers, splitters, switches, etc. encompassed by elements 202, 203, 204, and 206).

By incorporating SUTs in all end-user modems and all intermediary transport nodes of the data network, the ML-based AI analytical module (205) is able to capture and diagnose a complete end-to-end operating and functional snapshot of the data network in real time, which in turn enables rapid and autonomous identification and location-pinpointing of potential network problems (e.g. network quality-of-experience (QoE) problems), even without a human operator intervention in many instances.

In the preferred embodiment of the invention, the ML-based AI analytical module (205) is a software module executed in a cloud-computing resource (e.g. one or more cloud network-connected scalable servers). The ML-based AI analytical module (205) is also configured to improve accuracy and effectiveness of its autonomous QoE problem detection and location identification capabilities through an artificial intelligence (AI) refinement feedback loop provided by the big-data machine learning over an extended operational period, wherein the big data dynamically updated by the wireless LAN and broadband big data module (204) is an accumulation of various QoE parameters originating from end-user modems and intermediary transport-level network nodes and splitters. Furthermore, in the preferred embodiment of the invention, the ML-based AI analytical module (205) operating from the cloud-computing resource to monitor and identify QoE problems can coexist with legacy systems and conventional diagnostic tools within the data network, thus simplifying operational management of the data network by an ISP or another telecommunications service provider.

Moreover, the main components (200) of the machine learning-based network analytics, troubleshoot, and self-healing holistic telemetry system as shown in FIG. 2 also includes the visualization dashboard interface (206), which is a system user interface executed in a computer server to display various collected time-series diagnostic data parameters, converted/transformed input features, analytical processing indicators, and analytical outcomes. Examples of analytical outcomes visualized on a display panel connected to the machine learning-based network analytics, troubleshoot, and self-healing holistic telemetry system include, but are not limited to, likely nature and location of potential network problems identified autonomously by the ML-based AI analytical module (205), contents of autonomous machine-generated trouble tickets, and autonomous self-healing procedure information in an attempt to resolve the identified network problems automatically without human repairman interventions.

Figure 3:
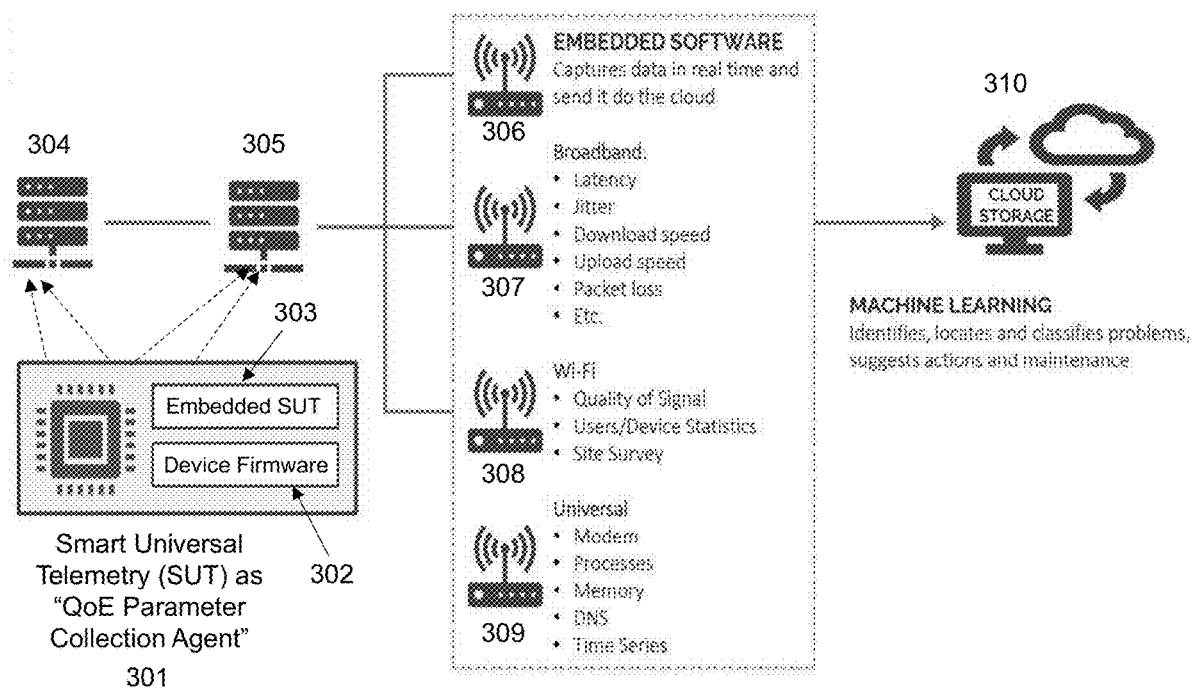
FIG. 3 shows an example of modem-embedded and/or other device-embedded smart universal telemetries (SUTs) in various nodes of a data network in the machine learning-based network analytics, troubleshoot, and self-healing holistic telemetry system, in accordance with an embodiment of the invention.

FIG. 3 shows an example (300) of modem-embedded and/or other device-embedded smart universal telemetries (SUTs) in various nodes of a data network in the machine learning-based network analytics, troubleshoot, and self-healing holistic telemetry system, in accordance with an embodiment of the invention. In this example (300) as shown in FIG. 3, an embedded SUT (303) is integrated into an end-user modem (304 or 305), and is configured to be executed on top of or in association with a modem device firmware (302), which is responsible for general operation of the end-user modem (304 or 305). The embedded SUT (303) functions as a quality-of-experience (QoE) parameter collection agent (301) for the end-user modem, which is operatively connected to one or more routers, splitters, switches, nodes, and other intermediary network equipment within a data network.

As illustrated by the example (300) in FIG. 3, in some embodiments of the invention, SUTs can also optionally be incorporated into such intermediary network equipment, such as a broadband router (307), a WiFi router (308), a network splitter, a network switch, or other intermediary network equipment (306, 309). In the preferred embodiment of the invention, each SUT is an embedded software configured to capture and transmit diagnostic data in real time to other components (e.g. 202, 203, 204, 205, or 206 in FIG. 2) of the machine learning-based network analytics, troubleshoot, and self-healing holistic telemetry system. The SUT in the broadband router (307) is configured to collect both passive and active data. Examples of collected passive data are transmission (TX), reception (RX), packet information, and modem counters. Moreover, for the active data collection, the SUT in the broadband router (307) is configured to generate active measurements for estimating download and upload throughput, latency, packet loss, and jitter against any measurement servers (e.g. 203 in FIG. 2) and at any time and frequency.

For example, the latency measurement from Point A to Point B can be conducted by the SUT in the broadband router (307) with one or more measurement servers in the network. The SUT can also determine whether a set of IPv6 users are blocked by a server (e.g. due to a blacklist), and generate active data collection based on dynamic or conditional events (e.g. if latency increases, check nearby neighbors' broadband throughput performance). Typically, the broadband router (307) captures latency, jitter, download speed, upload speed, DNS, and packet loss as diagnostic datasets, and transmits such datasets to a "big data" module (e.g. 204 in FIG. 2) and an ML-based AI analytical module (e.g. 205 in FIG. 2) operating on a cloud-computing resource and storage (310) connected to the data network, as shown in FIG. 3.

Furthermore, the WiFi router (308) captures quality of signal information, channel information, users/device statistics, and site survey information, and transmits such datasets to the "big data" module and the ML-based AI analytical module operating on the cloud-computing resource and storage (310), as shown in FIG. 3. In the preferred embodiment of the invention, network routers (307, 308) and other intermediary network equipment (306, 309) may also capture device health/functionality information, device process (e.g. current or historical) information, device memory content information, time-series information (e.g. DNS, Hashed MAC inside a modem for privacy, etc.), and collection mode information (e.g. broadcast, multicast, unicast, real-time collection, interval-based collection, etc.), which are subsequently transmitted to the "big data" module and the ML-based AI analytical module operating on the cloud-computing resource and storage (310).

Figure 4:
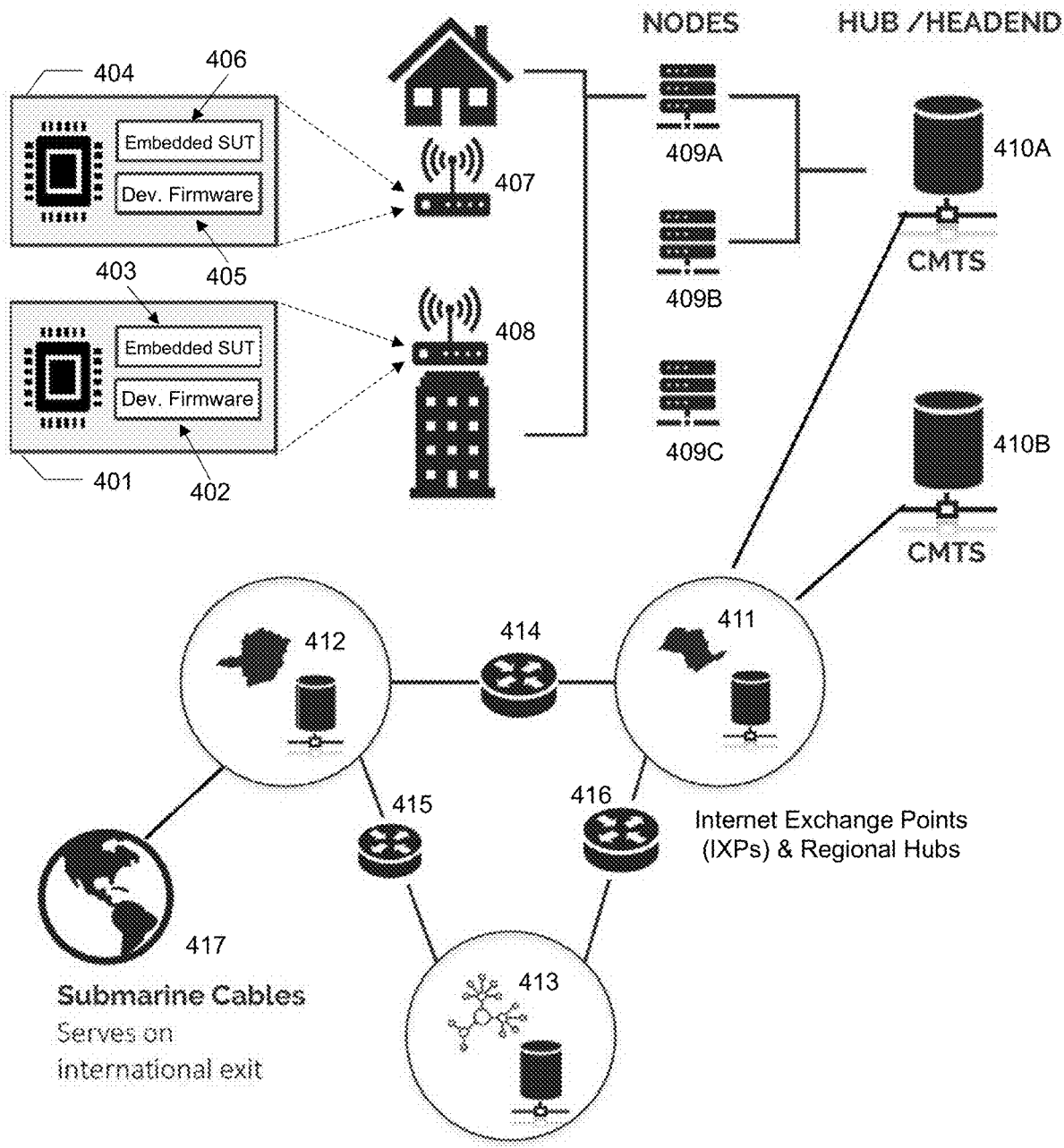
FIG. 4 shows an example of end user modem-embedded collection agents and network transport-level collection agents as smart universal telemetries (SUTs) integrated in various network nodes in the machine learning-based network analytics, troubleshoot, and self-healing holistic telemetry system, in accordance with an embodiment of the invention.

FIG. 4 shows an example (400) of end user modem-embedded collection agents and network transport-level collection agents as smart universal telemetries (SUTs) (403, 406) integrated in various network nodes in the machine learning-based network analytics, troubleshoot, and self-healing holistic telemetry system, in accordance with an embodiment of the invention. As shown in this example (400), an SUT (403 or 406) can be a QoE parameter collection agent module (401 or 404) embedded in an end-user modem (407, 408), or a transport-level collection agent module in another network equipment (409A-409C, 410A, 410B, 411, 412, 413, 414, 415, 416, 417) within various transport nodes of a data network.

Typically, the QoE parameter collection agent module (401 or 404) is configured to gather and transmit subscriber modem-originating diagnostic data parameters to a network operator's machine-learning diagnostic tool on an on-demand or periodic basis for network QoE problem discoveries and location identifications, which are autonomously performed by the machine-learning-based network analytics, troubleshoot, and self-healing holistic telemetry system. In the preferred embodiment of the invention as shown in FIG. 4, the SUT (403 or 406) can be an embedded QoE parameter collection software integrated into a modem communications chipset that also stores the modem's firmware (402, 405). In another embodiment of the invention, the SUT may be a combination of a sensor device and an embedded QoE parameter collection software integrated into a modem.

In the example (400) as shown in FIG. 4, an embedded SUT may also be integrated into various network transport-level intermediary equipment, such as routers, splitters, switches, nodes, and other intermediary network equipment, within a data network. Depending on a particular implementation of the machine learning-based network analytics, troubleshoot, and self-healing holistic telemetry system, SUT-embedding into transport-level intermediary equipment can occur at last-mile or intermediary nodes (409A, 409B, 409C), cable modem termination system (CMTS) at a network hub or headend (410A, 410B), various Internet exchange points (IXPs) (414, 415, 416), regional hubs (411, 412, 413), and in routers or repeaters associated with submarine cables (417) for international hubs.

Figure 5:
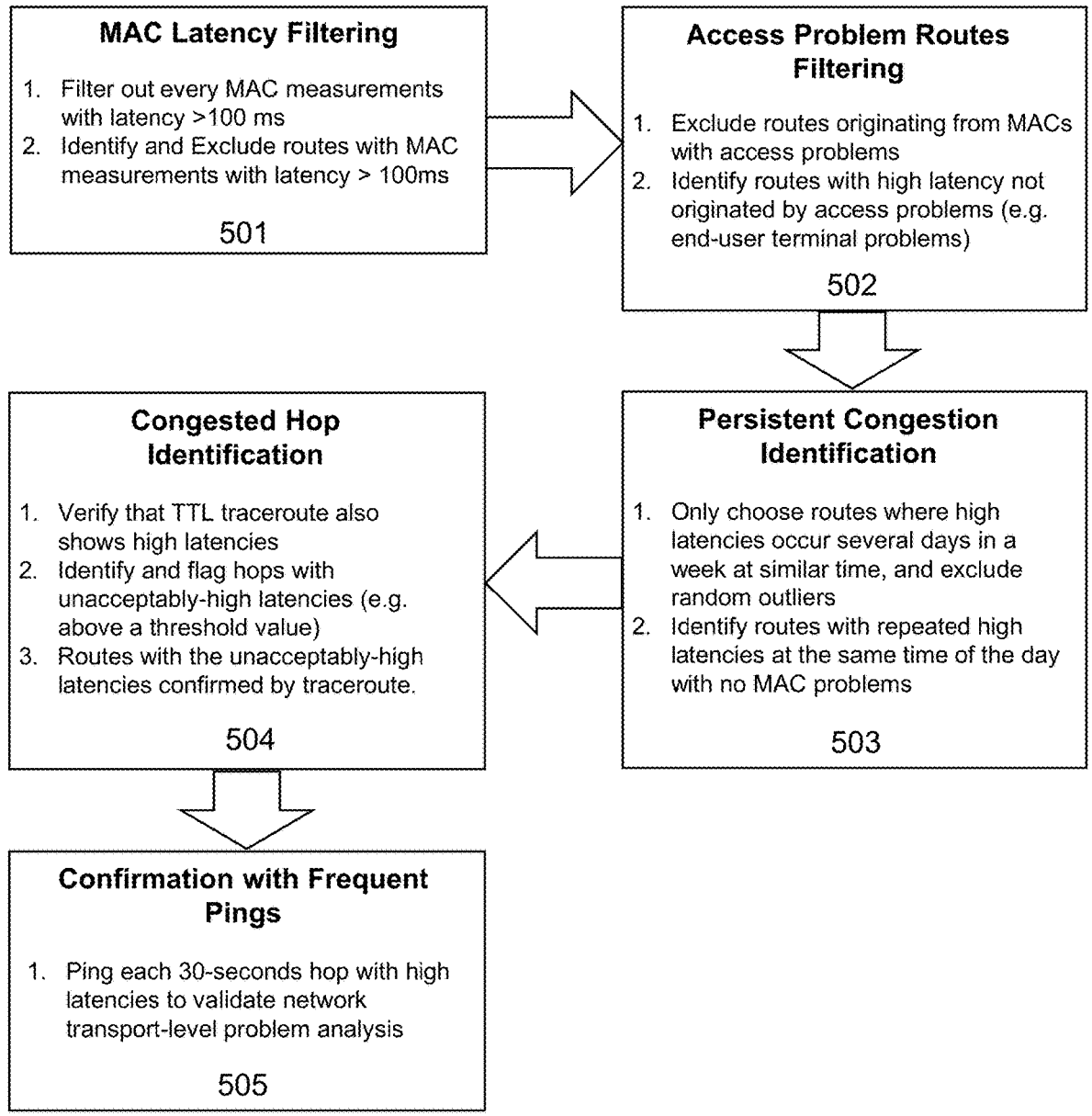
FIG. 5 shows an example of network transport-level problem identification by the artificial intelligence (AI) analytical module in the machine learning-based network analytics, troubleshoot, and self-healing holistic telemetry system, in accordance with an embodiment of the invention.

FIG. 5 shows an example (500) of network transport-level problem identification by the artificial intelligence (AI) analytical module in the machine learning-based network analytics, troubleshoot, and self-healing holistic telemetry system, in accordance with an embodiment of the invention. A "network transport-level problem" in context of various embodiments of the invention refers to an intermediary network connection failure or congestion, which is caused by an intermediary network equipment (e.g. a network router, a network splitter, a network server, a network switch, an electrical or optical cable, etc.) in a data network, as opposed to an end-user modem or an end-user device. In the preferred embodiment of the invention, an SUT in this situation may be embedded into an intermediary network equipment as a transport-level collection agent module to enable on-demand network diagnostic checkups and throughput performance measurements, when the machine learning-based network analytics, troubleshoot, and self-healing holistic telemetry system invokes the diagnosis from its AI analytical module.

As shown in the example (500) in FIG. 5, a first step (501) in the network transport-level problem identification is media access control (MAC) layer latency filtering. Typically, an excessive MAC latency suggests that something is wrong with an end-user device, an end-user modem, or another end-user hardware. Therefore, in a process to identify intermediary unit problems within a data network, it may be desirable to filter out every MAC measurements with latency greater than a certain threshold value (e.g. 100 milliseconds), and also identify and exclude routes with MAC measurements with latency greater than that threshold value in the system's intelligent and autonomous investigation of network transport-level problem identification process, as shown in the first step (501).

Subsequently, the AI analytical module in the machine learning-based network analytics, troubleshoot, and self-healing holistic telemetry system performs a second step (502) to further process the intelligent and autonomous investigation of network transport-level problem identification. The second step (502) further filters out access problem routes, which involves excluding routes originating from MACs with access problems and identifying routes with high latency not originated by access problems (e.g. end-user device or terminal problems). The AI analytical module then identifies persistent intermediary network congestion problems as a third step (503) in the intelligent and autonomous investigation of network transport-level problem identification. The third step (503) involves the AI analytical module selectively and intelligently choosing to only investigate routes where high latencies occur repeatedly over a predefined period (e.g. over a few days, a week, etc.), while excluding random outliers with sporadic and transient latencies. For example, the AI analytical module is able to identify "problematic" intermediary routes with repeated high latencies at the same time of the day with no MAC problems.

Then, the AI analytical module performs a congested hop identification process as a fourth step (504) of the intelligent and autonomous investigation of the network transport-level problem determination, as shown in FIG. 5. This fourth step (504) involves verifying that time-to-live (TTL) traceroutes also show high latencies on the identified problematic routes, and then identifying and flagging hops with unacceptably-high latencies, wherein the term "unacceptably-high" latencies may be defined as latencies above an acceptable threshold value. By the end of the fourth step (504), the AI analytical module is able to independently validate previously-identified routes with the unacceptably-high latencies. Lastly, the AI analytical module further confirms the identified network transport-level problems with frequent pings as a fifth step (505) of the autonomous machine analysis, as shown in FIG. 5. In one example, this confirmation procedure involves pinging each of the identified problematic high-latency routes with a 30-second hop to validate the network transport-level problem analysis.

Figure 6:
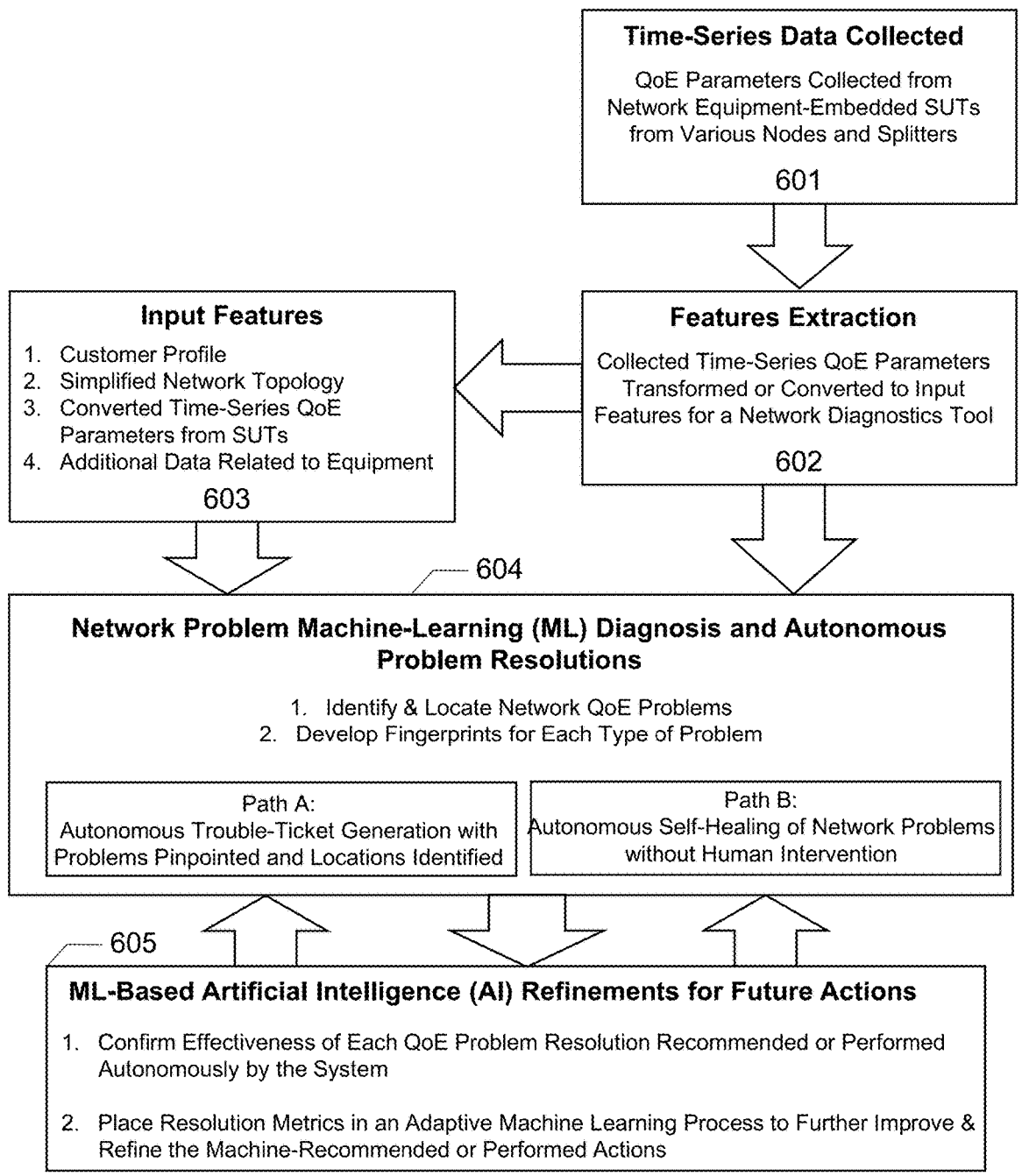
FIG. 6 shows an autonomous diagnostic process flow with an artificial intelligence (AI) refinement feedback loop in the machine learning-based network analytics, troubleshoot, and self-healing holistic telemetry system, in accordance with an embodiment of the invention.

FIG. 6 shows an autonomous diagnostic process flow (600) with an artificial intelligence (AI) refinement feedback loop (i.e. 604 to 605, and vice versa) in the machine learning-based network analytics, troubleshoot, and self-healing holistic telemetry system, in accordance with an embodiment of the invention. In one implementation of the present invention, the first three processing steps (601, 602, 603) in this autonomous diagnostic process flow (600) are executed by the network diagnostic data reading sub-block of the machine learning (ML)-based artificial intelligence analytical module (i.e. 205 in FIG. 2), while the fourth processing step (604) is executed by the network diagnostic analysis tool sub-block and the QoE problem resolution sub-block in the ML-based artificial intelligence analytical module. Furthermore, the fifth processing step (605) with a loopback to the fourth processing step is executed by the network heuristic rules validation sub-block with AI refinements for future actions, as shown in FIG. 6.

The first step (601) in the autonomous diagnostic process flow (600) involves collection of time-series data and other diagnostic data as QoE parameters from network equipment-embedded SUTs from various network nodes, splitters, routers, servers, and end-user modems. Then, the collected time-series QoE parameters are transformed or converted to input features format compatible to a network diagnostics tool, as shown in the second step (602). In the preferred embodiment of the invention, the input features are synthesized into an AI analytics module input-compatible format that includes a customer profile, a simplified network topology, converted time-series QoE parameters from SUTs, and any additional diagnostics or performance data related to network equipment, as shown in the third step (603).

Then, the network diagnostic analysis tool sub-block and the QoE problem resolution sub-block in the ML-based artificial intelligence (AI) analytical module (e.g. 205 in FIG. 2) perform autonomous machine diagnosis of network QoE problem identification and formulate machine-determined problem resolutions as shown in the fourth step (604) of the autonomous diagnostic process flow (600). In the preferred embodiment of the invention, the ML-based AI analytical module is a software module executed in a cloud-computing resource (e.g. one or more cloud network-connected scalable servers). The ML-based AI analytical module is also configured to improve accuracy and effectiveness of its autonomous QoE problem detection and location identification capabilities through an artificial intelligence (AI) refinement feedback loop (i.e. 604 to 605, and vice versa) provided by the big-data machine learning over an extended operational period.

The big data dynamically updated in the ML-based network analytics, troubleshoot, and self-healing holistic telemetry system is an accumulation of various QoE parameters originating from end-user modems, intermediary transport-level network nodes, splitters, routers, servers, and other network equipment. The ML-based AI analytical module operating from the cloud-computing resource to monitor and identify QoE problems, as shown in the fourth step (604) and the fifth step (605) of the autonomous diagnostic process flow (600), can coexist with legacy systems and conventional diagnostic tools within the data network, thus simplifying operational management of the data network by an ISP or another telecommunications service provider.

As shown in FIG. 6, the fourth step (604) of the autonomous diagnostic process flow (600) first identifies and locates network QoE problems. In particular, the ML-based AI analytical module is able to autonomously discover network QoE problems and pinpoint the source of such problems originating from an equipment failure within an intermediary transport node, a splitter, an end-user modem, a data line disconnection, a power outage in a certain region, etc. Then, the machine learning-based network analytics, troubleshoot, and self-healing holistic telemetry system utilizes artificial intelligence to develop fingerprints for each type of problem to comprehend traits, origins, and characteristics autonomously for each problem, and then to follow one of the two pathways autonomously (i.e. without human operator interventions) to resolve QoE problems.

The first path (i.e. "Path A") involves an autonomous trouble-ticket generation with problems pinpointed and locations identified by the machine learning-based network analytics, troubleshoot, and self-healing holistic telemetry system without human operator interventions. Once a trouble ticket is generated, a human repair technician can use the autonomous machine-identified QoE problem descriptions, problem source location information, and recommended repair actions to perform an onsite repair, a customer premise visit for an equipment replacement or repair, or another action to resolve the QoE problems as rapidly and efficiently as possible. For the machine learning-based network analytics, troubleshoot, and self-healing holistic telemetry system, this first path (i.e. "Path A") may be an optimal solution for resolving network QoE problems that require physical repairs or replacement of parts, equipment, and/or connections, instead of software-based online repair actions.

On the other hand, as also shown in the fourth step (604) in the autonomous diagnostic process flow (600) in FIG. 6, the second path (i.e. "Path B") involves an autonomous self-healing of network QoE problems without human repair technician interventions. The autonomous self-healing approaches for QoE problem resolutions are particularly ideal if a network congestion or a disconnection can be resolved by taking a software-based online repair action to a machine-identified source of the QoE problem. Examples of such software-based online repair actions include, but are not limited to, changing a wireless LAN channel in an end-user modem, rebooting a network equipment, and/or reinstalling a piece of software in a device identified as the source of the network QoE problem.

The autonomous diagnostic process flow (600) also incorporates the fifth step (605) that confirms effectiveness of each QoE problem resolution recommended or performed autonomously by the system. A quantitative or qualitative evaluation of the effectiveness of QoE problem resolutions is then utilized as a resolution metric in an adaptive machine-learning process to further improve and refine the machine-recommended or performed actions in a feedback loop with the fourth step (605), as shown in FIG. 6. Over time, the iterative adaptive machine learning provided by this feedback loop increases the effectiveness and the accuracy of the autonomous diagnostic process by the machine learning-based network analytics, troubleshoot, and self-healing holistic telemetry system.

Figure 7:
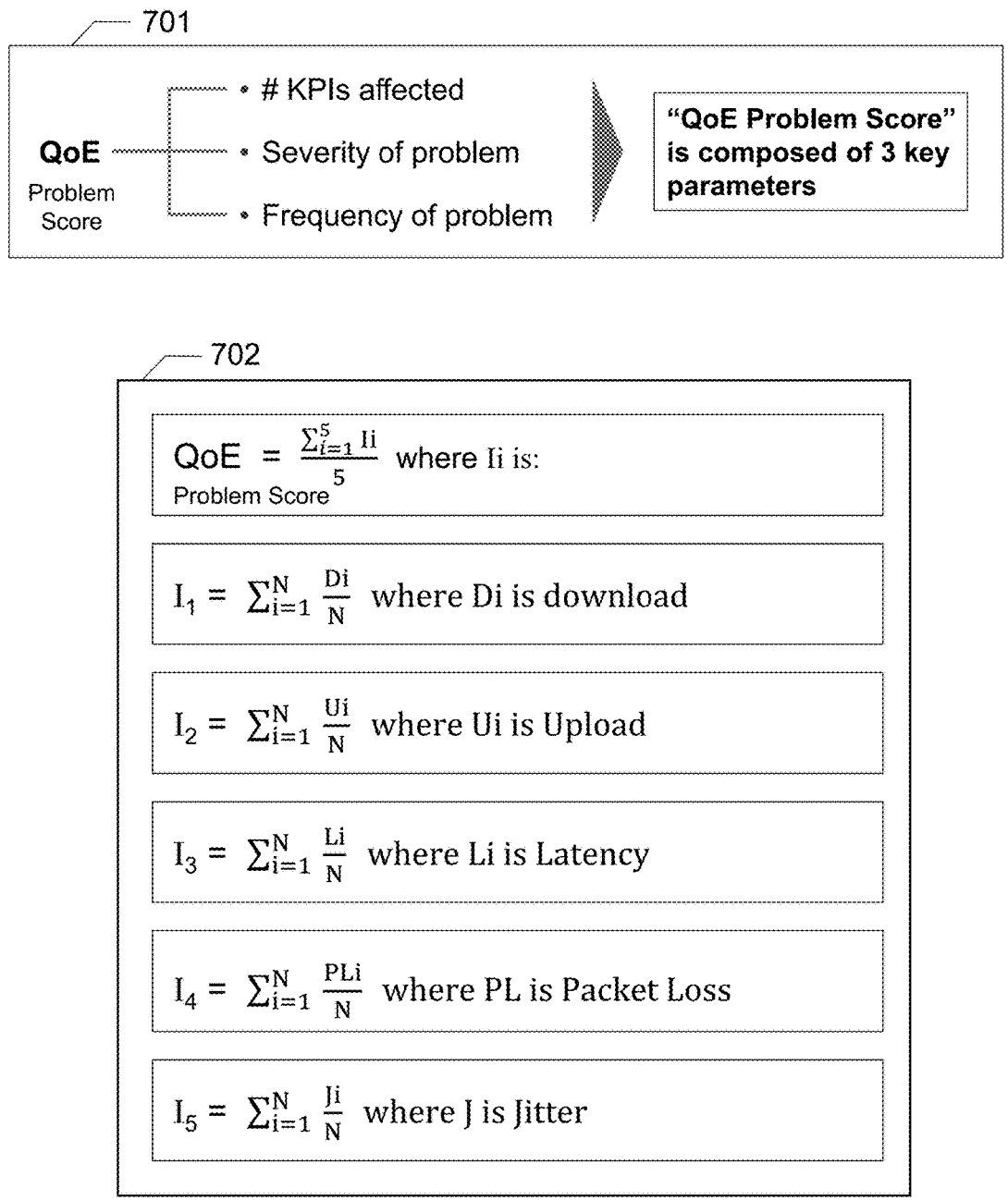
FIG. 7 shows an example of a "quality of experience" (QoE) analysis for a one-day measurement window performed by the machine learning-based network analytics, troubleshoot, and self-healing holistic telemetry system, in accordance with an embodiment of the invention.

FIG. 7 shows an example of a "quality of experience" (QoE) analysis (700) for a one-day measurement window performed by the machine learning-based network analytics, troubleshoot, and self-healing holistic telemetry system, in accordance with an embodiment of the invention. As shown in an upper diagram box (701) in FIG. 7, a QoE problem evaluation metric (i.e. "QoE problem score") comprises (1) number of key performance indicators (KPIs) affected by a problem, (2) severity of the problem, and (3) frequency of the problem as three key input parameters and criteria in defining what the QoE problem score means to a network health and customer satisfaction analysis. In general, higher QoE problem scores suggest more urgency and necessity to repair the problem to resolve network-related customer inconvenience and dissatisfaction. For example, more KPIs affected by a problem, higher severity of the problem, higher reoccurrence/frequency of the problem, or a combination thereof increases the QoE problem score. Likewise, less KPIs affected by the problem, lower severity of the problem, lower reoccurrence/frequency of the problem, or a combination thereof decreases the QoE problem score.

Furthermore, as shown in a lower diagram box (702) in FIG. 7, the QoE problem score for a one-day measurement window may be calculated and/or derived as an average value of the summation of multiple key performance indicators (KPIs). In this example, five KPIs (i.e. $I_1$~$I_5$) are chosen for the QoE problem score calculation. These five KPIs are download performance problems ($I_1$), upload performance problems ($I_2$), latency problems ($I_3$), packet loss problems ($I_4$), and jitter problems ($I_5$), as shown in the lower diagram box (702) in FIG. 7.

FIG. 8 shows an example (800) of a QoE analysis for a three-day measurement window performed by the machine learning-based network analytics, troubleshoot, and self-healing holistic telemetry system, in accordance with an embodiment of the invention. In this instance, the three-day measurement window for the QoE analysis involves deriving a QoE problem score over three days, wherein the QoE problem score is calculated as the average of the summation of daily QoE problem scores. An exemplary formula (801) in FIG. 8 demonstrates how the QoE analysis can be conducted by the machine learning-based network analytics, troubleshoot, and self-healing holistic telemetry system over the three-day measurement window. In other embodiments of the invention, this method of QoE analysis can be applied over any period of time (e.g. a seven-day measurement window, a monthly measurement window, etc.), depending on the needs of a particular network service operator.

Figure 9:
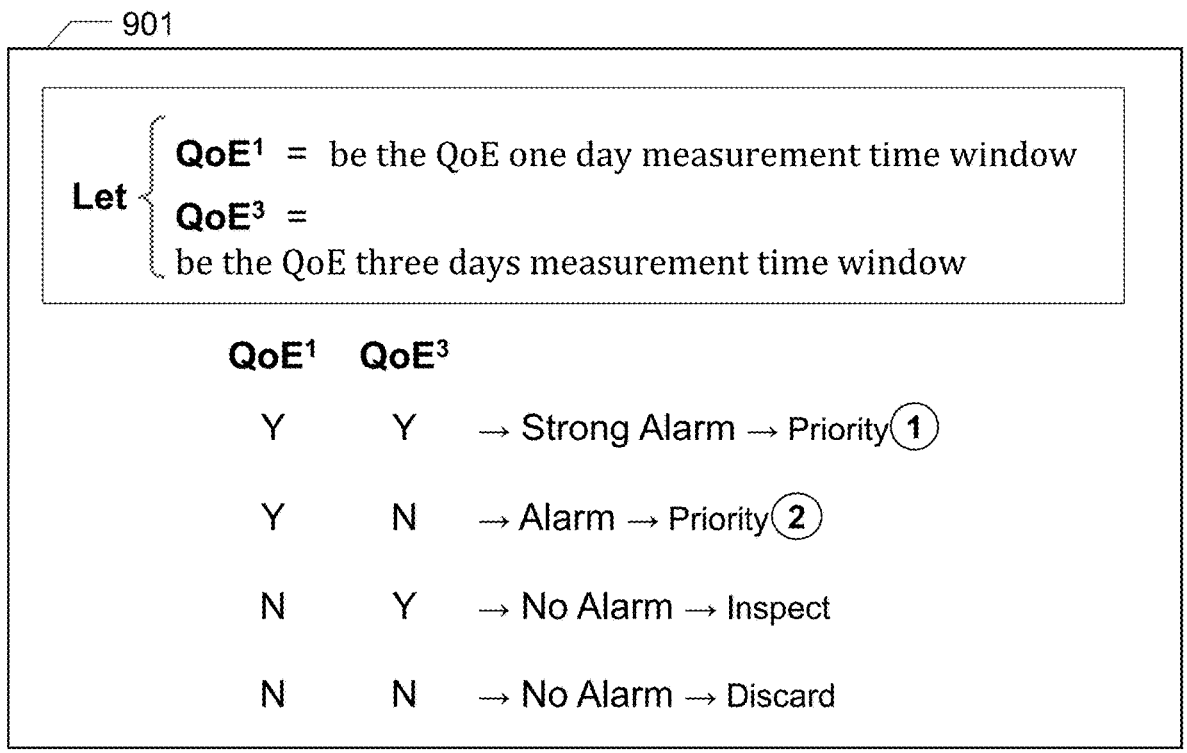
FIG. 9 shows an example of QoE improvement priority rules determined from one-day and three-day measurement window QoE alerts in the machine learning-based network analytics, troubleshoot, and self-healing holistic telemetry system, in accordance with an embodiment of the invention.

FIG. 9 shows an example (900) of QoE improvement priority rules determined from one-day and three-day measurement window QoE problem alerts in the machine learning-based network analytics, troubleshoot, and self-healing holistic telemetry system, in accordance with an embodiment of the invention. In a preferred embodiment of the invention, a network heuristic rules validation sub-block (e.g. 605 in FIG. 6) in the machine learning (ML)-based artificial intelligence analytical module (e.g. 205 in FIG. 2) is configured to conduct a basic "sanity check" as well as repair priority rules check against network heuristic rules pertinent to the identified network QoE problem.

For instance, the network heuristic rules validation sub-block may determine an order of network repair priority for resolving multiple network QoE problems by performing sanity checks and QoE improvement priority checks against network heuristic rules, as illustrated in a repair priority rule demonstration example (901) in FIG. 9. In this repair priority rule demonstration example (901), the highest priority for repair is assigned to a network problem that exhibited alarming QoE problem scores (e.g. above threshold value(s)) for both one-day and three-day measurement analysis, while the second highest priority for repair is assigned to another network problem that generated an alarming QoE problem score (e.g. above a threshold value) on a one-day measurement window but not on a three-day measurement window. In this repair priority rule demonstration example (901), if the three-day measurement window had an alarming QoE problem score but merely a non-alarming QoE problem score on the one-day measurement window, then a lower-priority inspection alert may be flagged for that particular network problem.

Furthermore, if both one-day and three-day measurement windows generated no alarming levels of QoE problem scores, then logically, a potential network problem previously identified by the machine for that particular case may be discarded or deleted from the system, as shown in FIG. 9. In another instance, the network heuristics rules validation sub-block may determine that the basic sanity check and/or repair priority rules check associated with the identified network QoE problem suggest that the problem is either already resolved or falsely flagged by SUTs or other components of the system.

FIG. 10 shows two conceptual diagrams (1000) for multi-dimensional holistic network diagnostic capabilities provided by the machine learning-based network analytics, troubleshoot, and self-healing holistic telemetry system, which incorporates modem-embedded machine analysis of multi-protocol stacks, in accordance with an embodiment of the invention. The first conceptual diagram (1001) demonstrates how the novel telemetry system in the present invention analyzes potential data network problems in three dimensions: (1) space, (2) time, and (3) Internet protocol stack.

As illustrated in the first conceptual diagram (1001), space can be conceptualized in granularities based on distance or regions relative to a data network. For example, the dimension of space in context of network analytics may be categorized per city, per node or splitter within that city, and per individual household for identifying potential network problems. Furthermore, as also illustrated in the first conceptual diagram (1001), the dimension of time can be conceptualized in granularities of seconds, minutes, hours, days, weeks, or months for categorizing potential network problems.

In addition, the machine learning-based network analytics, troubleshoot, and self-healing holistic telemetry system as disclosed in this embodiment of the present invention also uniquely utilizes each layer of the Internet protocol stack (e.g. layers of an OSI stack) as a third dimension for categorizing potential network problems. Unlike conventional network diagnostic tools that tend to be disparate or discrete for monitoring different layers of the Internet protocol stack, the machine learning-based network analytics, troubleshoot, and self-healing holistic telemetry system of the present invention is designed to monitor all Internet protocol stack layers (i.e. physical, link, network, transport, and application layers) simultaneously and holistically with a modem-embedded machine analysis of multi-protocol stacks, and identify potential data network problems from one integrated diagnostic structure alone in the data network.

As shown in the second conceptual diagram (1002), the machine learning-based network analytics, troubleshoot, and self-healing holistic telemetry system is configured to monitor and fetch any desired network diagnostic data from anywhere, from anytime, and from any multi-protocol stacks simultaneously, which expedites pinpointing and resolving network problems regardless of location, timeframe, and equipment complexity within the data network. For instance, in one embodiment of the invention, the holistic telemetry system can simultaneously monitor (1) QoE data from the application layer, (2) down/up throughput, latency, packet loss, and jitter from the transport and network layers, (3) transmission (TX) and reception (RX) bytes and errors from the link layer, and (4) signal-to-noise ratio (SNR), TX power, RX power, and private network maintenance (PNM) data from the physical layer, as illustrated in the second conceptual diagram (1002) in FIG. 10.

In the preferred embodiment of the invention, the machine learning-based network analytics, troubleshoot, and self-healing holistic telemetry system is configured to integrate network diagnostics data collection from various space, time, and protocol stack dimensions simultaneously and in real time to provide a comprehensive and integrated diagnostic capabilities on a user-centric, software-based, and hardware agnostic machine-learning platform, which can coexist with a network provider's legacy data network diagnostic architecture while still enhancing the network's QoE and operational efficiencies. In particular, the holistic telemetry system is focused on improving QoE and customer satisfaction, and utilizes edge computing by collecting most, if not all, of the diagnostic data at the modem level.

Furthermore, the utilization of edge computing in this instance makes the holistic telemetry system more scalable and compatible to various network infrastructures, compared to conventional and centralized diagnostic collection models. The holistic telemetry system is also hardware agnostic, because the system can be executed as an integrated software on top of various types of network architecture configurations and implementations. Moreover, the simultaneous, real-time, and on-demand monitoring of all protocol stacks by the holistic telemetry system provides speed, efficiency, and legacy architecture compatibility advantages over conventional discrete network monitoring tools.

FIG. 11 shows an example (1100) of simultaneous multi-layer problem detection in an OSI model by the machine learning-based network analytics, troubleshoot, and self-healing holistic telemetry system, which incorporates modem-embedded machine analysis of multi-protocol stacks, in accordance with an embodiment of the invention. As shown in this example (1100), the key performance indicator (KPI) for the application layer may be QoE, which may be quantified by criteria types such as a deteriorating or poor video quality as seen by the customer. An application layer-level problem may be defined by a threshold level for QoE measures. For example, if the quality of the video falls below the defined threshold level for QoE measures, the holistic telemetric system identifies the application layer as having a potential quality problem for the particular customer utilizing the video stream. The granularity of application-level problem detection is typically defined and identified per desktop or mobile application executed on the customer device.

In addition, as shown in the example (1100) in FIG. 11, the KPI for the transport layer in the OSI model may be quality of service (QoS) as a function of distance (e.g. miles, kilometers) between two or more network equipment, wherein QoS measures are defined by acceptable levels for download/upload throughputs, latency, jitter, and packet loss. In the preferred embodiment of the invention, QoS may be evaluated and quantified by Data-over-Cable Service Interface Specification (DOCSIS) metrics, which is a function of distance between two or more network equipment. As further illustrated in the example (1100) in FIG. 11, a transport layer-level problem may be defined by a threshold level for QoS measures. For instance, if the QoS quality falls below defined threshold level for QoS measures such as download/upload throughputs, latency, jitter, and packet loss, the holistic telemetric system identifies the transport layer as having a potential quality problem, which may further be categorized by deployed types of technology (e.g. DOCSIS, GPON, mobile, etc.).

Moreover, as shown in the example (1100) in FIG. 11, the KPI for the network layer in the OSI model may be defined by domain name system (DNS) problems, content delivery network (CDN) problems, game server problems, transport, or congestion problems at the network layer level. In addition, the KPI for the link layer in the OSI model may be defined by wireless local area network (LAN) problems (e.g. coverage problem, channel interference, wireless LAN device problems), or DOCSIS problems related to a modem device or an excessive rate of modem utilization. Lastly, the KPI for the physical layer in the OSI model may be defined as an access problem arising from problems related to the modem device, internal wiring, external plant, node, splitter, CMTS, and/or OLT equipment in the data network.

FIG. 12 shows a simultaneous multi-layer data collection process example (1200) by the machine learning-based network analytics, troubleshoot, and self-healing holistic telemetry system, which incorporates modem-embedded machine analysis of multi-protocol stacks, in accordance with an embodiment of the invention. In the first diagram (1201) of the simultaneous multi-layer data collection process example (1200) in FIG. 12, the holistic telemetry system is configured to collect network diagnostic data samples periodically or in real time from all OSI layers, including application, transport, network, link, and physical layers. In the preferred embodiment of the invention, the diagnostic data sample for the application layer may be a customer application data sample (e.g. a sample of an audio, a video, or another customer-level application data transmitted or received through the data network), and the diagnostic data sample for the transport layer may be download, upload, packet loss, latency, or jitter measurements associated with congestion or transport problems.

Moreover, as shown in the first diagram (1201) of the simultaneous multi-layer data collection process example (1200) in FIG. 12, the diagnostic data sample for the network layer may be tracer route or pings that can identify DNS or CDN availability and errors, while the diagnostic data sample for the link layer may be wireless LAN-related device, channel, and coverage quality and performance information, or DOCSIS-related TX/RX bytes, error, buffer queue size, maximum upload or download throughputs, and error logs. Lastly, the diagnostic data sample for the physical layer in the OSI layers utilized by the holistic telemetry system may be PNM samples associated with SNR, TX/RX power, and pre-equalizers, as shown in the first diagram (1201).

Furthermore, as shown in the second diagram (1202) of the simultaneous multi-layer data collection process example (1200) in FIG. 12, a system operator can customize and configure multi-layer data collection frequencies, time granularities, and sample quantities based on a particular need of a data network management. For example, in "Collection Scheme A" in the second diagram (1202), the collection frequency is 30 minutes, with minutes chosen as the time granularity, and the sample quantities are set to 30 samples per collection frequency. In another example, as shown in "Collection Scheme B" in the second diagram (1202), the collection frequency is 300 seconds, with seconds chosen as the time granularity, and the sample quantities are set to 300 samples per collection frequency.

FIG. 13 shows a chart (1300) displaying network diagnostic command types and examples (1301) in the machine learning-based network analytics, troubleshoot, and self-healing holistic telemetry system incorporating modem-embedded machine analysis of multi-protocol stacks, in accordance with an embodiment of the invention. In the preferred embodiment of the invention, any command is dynamically programmable, and can be configured to be executed at predefined time intervals or through on-demand (i.e. real-time) triggers. Furthermore, some commands, such as new scripts and time-series commands, can be composed in script forms on the fly as desired, and then be executed to operate new scripted commands at modem-levels and collect time-series data, as shown in the chart (1300) in FIG. 13.

FIG. 14 shows an example (1400) of command parameters for the machine learning-based network analytics, troubleshoot, and self-healing holistic telemetry system incorporating modem-embedded machine analysis of multi-protocol stacks, in accordance with an embodiment of the invention. In the preferred embodiment of the invention, command parameters may include, but are not limited to, "Head," "ID," "Command Number," "SQ," "Command," "Command Type," "TGranularity," "IP/DNS," "Tresp," "CK," "Privacy Mode," and "Command Priority," as illustrated in the example (1400) in FIG. 14. In other embodiments of the invention, there may be more, less, or different command parameters, as desired by particular needs of a data network operator, for effective and simultaneous multi-protocol stack monitoring and diagnosis.

Figure 15:
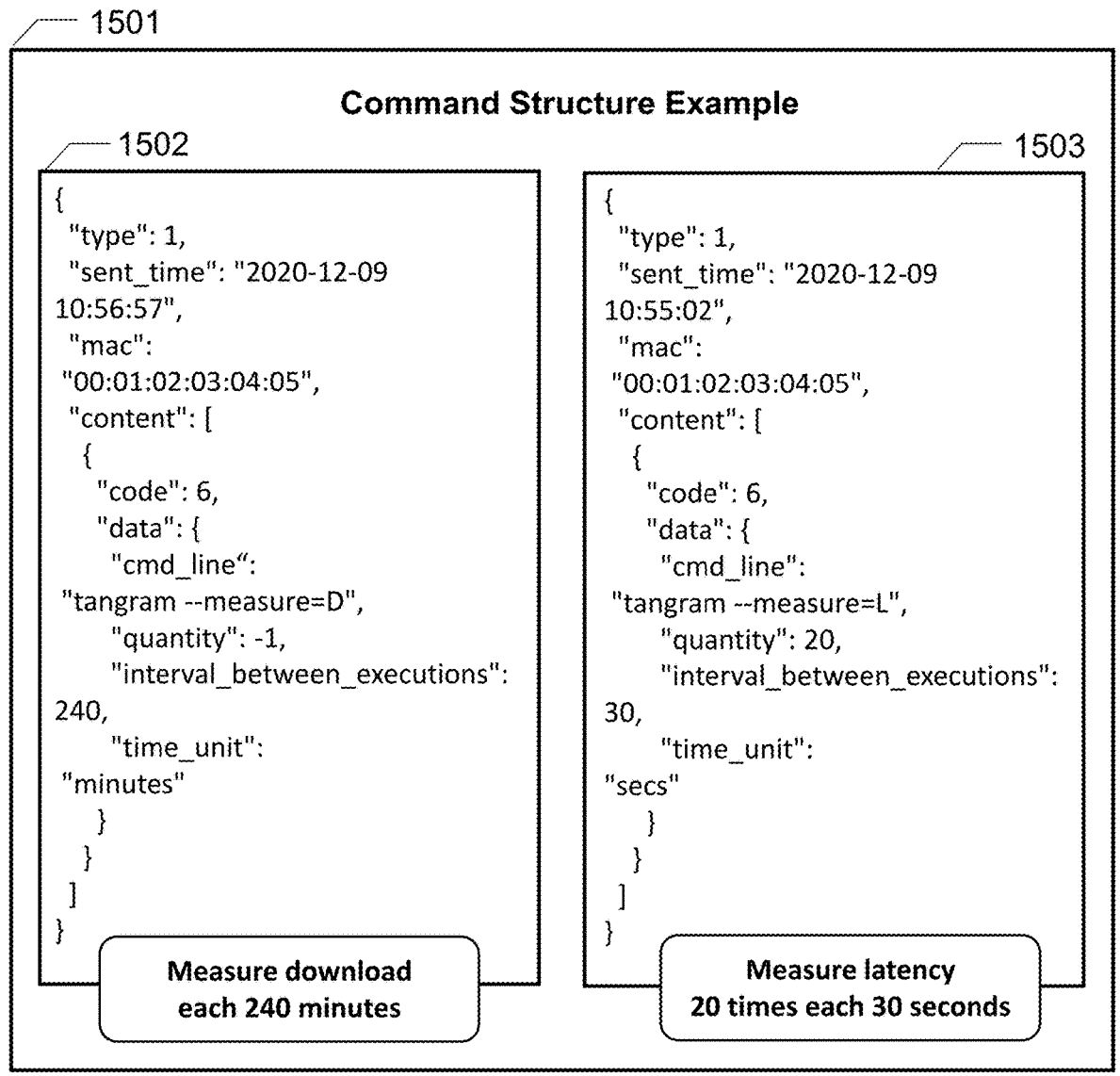
FIG. 15 shows a diagram of command structure examples for the machine learning-based network analytics, troubleshoot, and self-healing holistic telemetry system incorporating modem-embedded machine analysis of multi-protocol stacks, in accordance with an embodiment of the invention.

FIG. 15 shows a diagram (1500) of command structure examples (1501) for the machine learning-based network analytics, troubleshoot, and self-healing holistic telemetry system incorporating modem-embedded machine analysis of multi-protocol stacks, in accordance with an embodiment of the invention. In the first command structure example (1502), programmed codes are configured to measure download quality periodically with a 240-minute time interval. In the second command structure example (1503), programmed codes are configured to measure latency twenty times periodically with a 30-second time interval. As shown in these command structure examples (1501), a network operator is able to dynamically program and modify network diagnostic commands, monitoring intervals, and sampling sizes in the holistic telemetry system to best suit the network operator's particular needs and circumstances.

Figure 16:
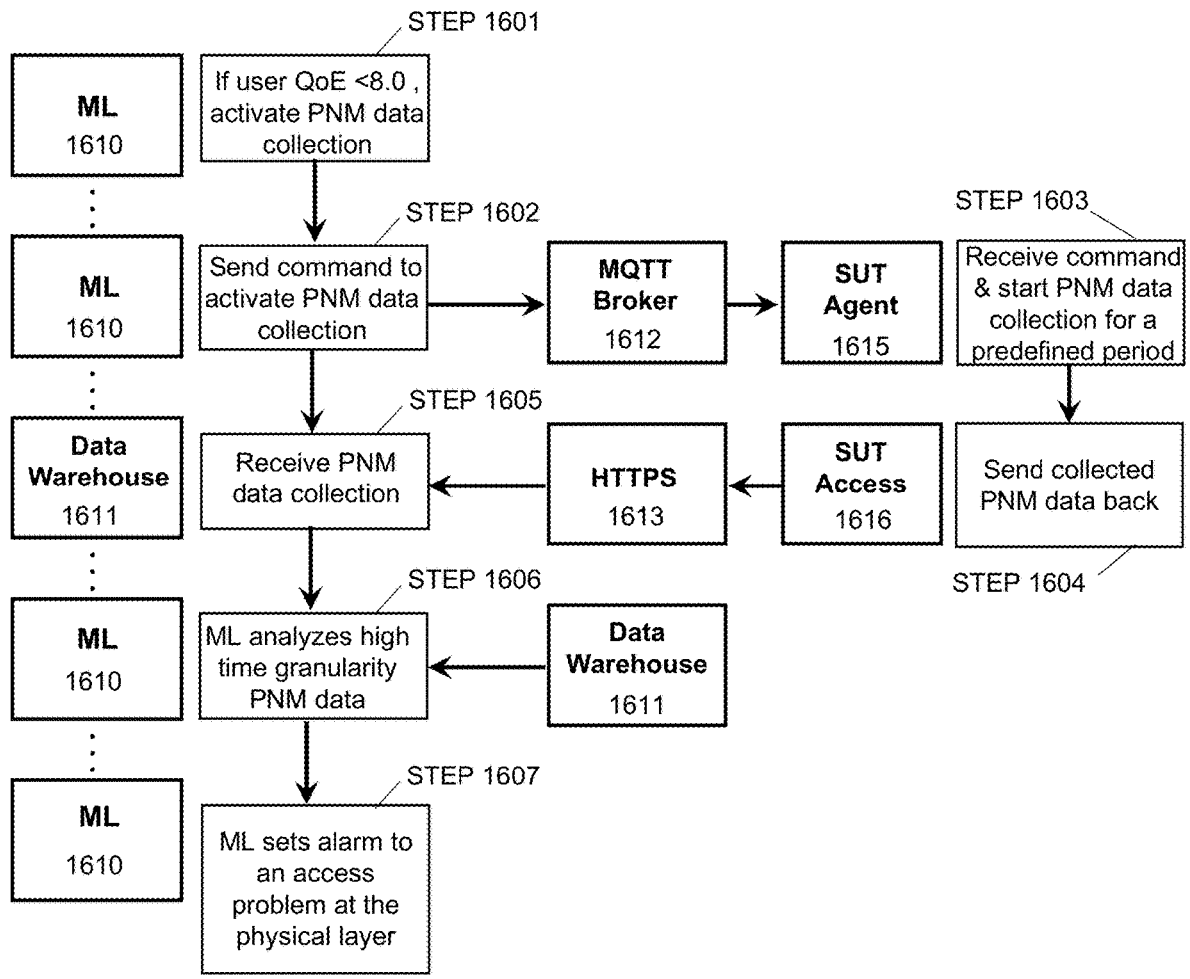
FIG. 16 shows a machine learning (ML) and smart universal telemetry (SUT) agent interaction diagram for the machine learning-based network analytics, troubleshoot, and self-healing holistic telemetry system incorporating modem-embedded machine analysis of multi-protocol stacks, in accordance with an embodiment of the invention.

FIG. 16 shows a machine learning (ML) and smart universal telemetry (SUT) agent interaction diagram (1600) for the machine learning-based network analytics, troubleshoot, and self-healing holistic telemetry system incorporating modem-embedded machine analysis of multi-protocol stacks, in accordance with an embodiment of the invention. In this example, the holistic telemetry system starts a fine-time granularity private network maintenance (PNM) data collection when the system detects a low-broadband QoE. Then, the holistic telemetry system is able to analyze the collected PNM data to identify a physical layer-access problem at a broadband access point.

As shown in the ML and SUT agent interaction diagram (1600), the holistic telemetry system first determines whether a user QoE measure is below a predefined threshold value (e.g. 8.0 in this example) from a machine-learning (ML) module (1610), as shown in STEP 1601. If the user QoE measure is below the predefined threshold value, the system interprets the situation as detecting a low-broadband QoE that requires further machine-initiated investigation. The holistic telemetry system subsequently sends a command to activate PNM data collection, as shown in STEP 1602, which goes through an MQ telemetry transport (MQTT) broker (1612) to reach an SUT agent (1615). The SUT agent (1615) is typically embedded in a modem or another network equipment. After the SUT agent (1615) receives the activation command from the ML module (1610) through the MQTT broker (1612), the SUT agent (1615) initiates the PNM data collection for a predefined period as configured by the system operator, as shown in STEP 1603.

Then, as shown in STEP 1604, the SUT agent (1615) sends the collected PNM data back to a data warehouse (1611) connected to the ML module (1610) via hypertext transfer protocol secure (HTTPS) (1613), when an SUT access (1616) is requested by the ML module (1610). After receiving the collected PNM data, as shown in STEP 1605, the ML module (1610) analyzes high time granularity PNM data in STEP 1606, and then sets alarm to an access problem at the physical layer in STEP 1607, as illustrated in FIG. 16.

Figure 17:
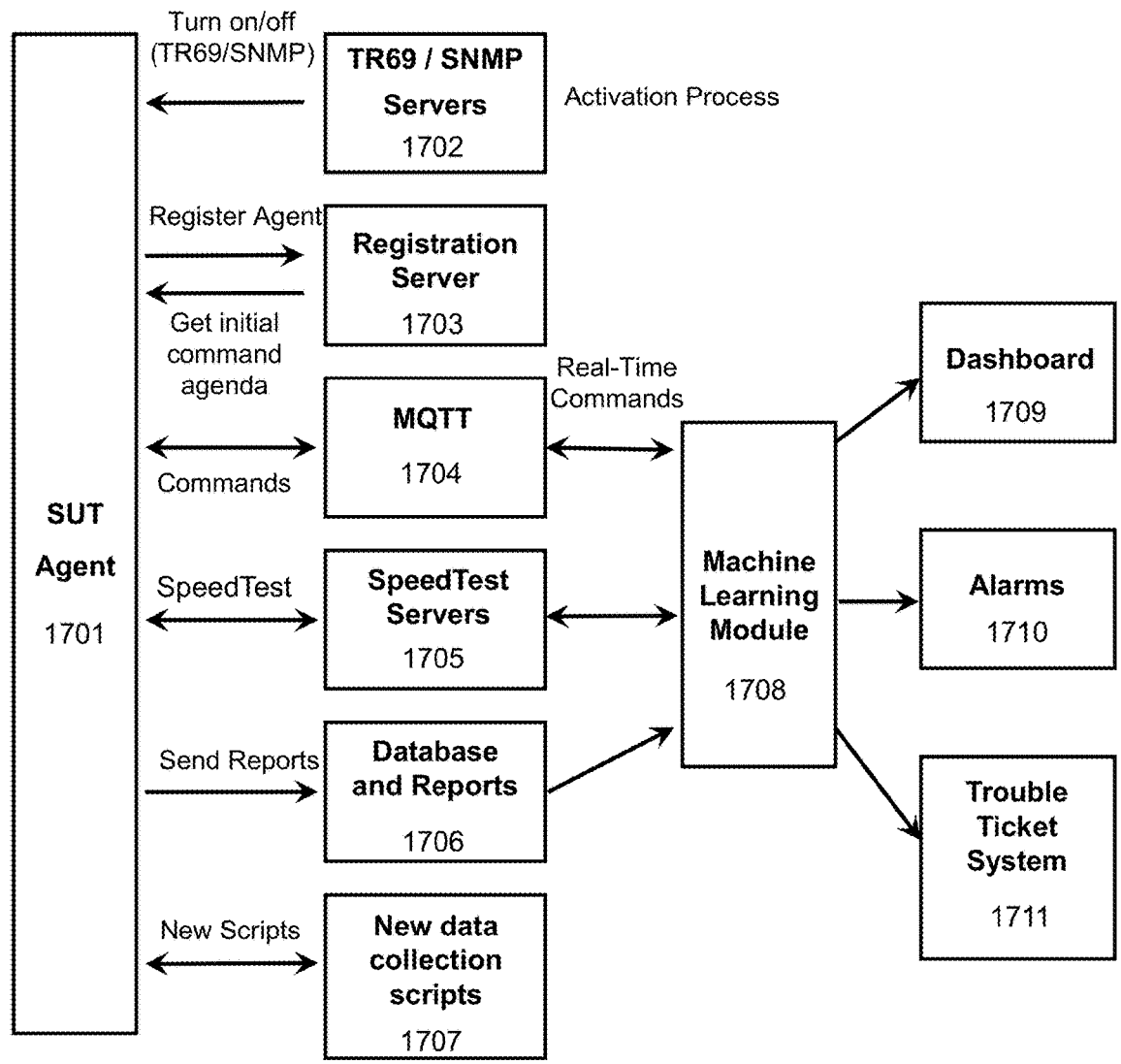
FIG. 17 shows a command and dataflow architectural diagram for the machine learning-based network analytics, troubleshoot, and self-healing holistic telemetry system incorporating modem-embedded machine analysis of multi-protocol stacks, in accordance with an embodiment of the invention.

FIG. 17 shows a command and dataflow architectural diagram (1700) for the machine learning-based network analytics, troubleshoot, and self-healing holistic telemetry system incorporating modem-embedded machine analysis of multi-protocol stacks, in accordance with an embodiment of the invention. As illustrated in this diagram (1700), the holistic telemetry system incorporates one or more SUT agents (1701) embedded in modems and other network equipment in a data network that requires monitoring and diagnosis.

The holistic telemetry system also comprises a TR69 (Technical Report 069 Protocol) and SNMP (simple network management protocol) server (1702), a registration server (1703), an MQTT brokering server (1704), a speed test server (1705), database and reports (1706), new data collection scripts (1707), all of which are operatively connected to a machine-learning (ML) module (1708), as shown in FIG. 17. The ML module (1708) is further connected to user interfaces and output systems, such as a user interface (UI) dashboard (1709) that displays a UI control interface for the system, an alarm configuration system (1710) that enables network problem alert user customizations, and a trouble ticket system (1711) that generates digitized or paper trouble tickets for outlining network repair locations and needs to network repair technicians.

In the preferred embodiment of the invention, the TR69/SNMP server (1702) is configured to control activation process and device on/off features for each SUT agent (1701). The registration server (1703) accommodates device registration of each SUT agent (1701) to the holistic telemetry system, and also transmits an initial command agenda to each SUT agent (1701), as illustrated in the command and dataflow architectural diagram (1700). Then, each SUT agent (1701) and the ML module (1708) are engaged in bidirectional, real-time, and/or on-demand communications via the MQTT server (1704). For instance, the ML module (1708) is able to send real-time commands to a particular SUT agent as needed to retrieve various pieces of network diagnostics information associated with the entire OSI stack to enable the modem-embedded machine analysis of multi-protocol stacks in the ML module (1708). In another instance, the particular SUT agent may voluntarily flag a troublesome performance parameter first and transmit related information to the ML module (1708).

Furthermore, an SUT agent (1701) and the ML module (1708) in the holistic telemetry system are configured to conduct a data throughput test via the speed test server (1705), and the SUT agent (1701) can synthesize network diagnostic reports periodically or on demand to generate the database and reports (1706), which are then transmitted to the ML module (1708). Moreover, the SUT agent (1701) is able to receive or transmit the new data collection scripts (1707) for dynamic instructional modifications to a network diagnostic data collection scheme, which is controlled and optimized by a network operator as desired.

Figure 18:
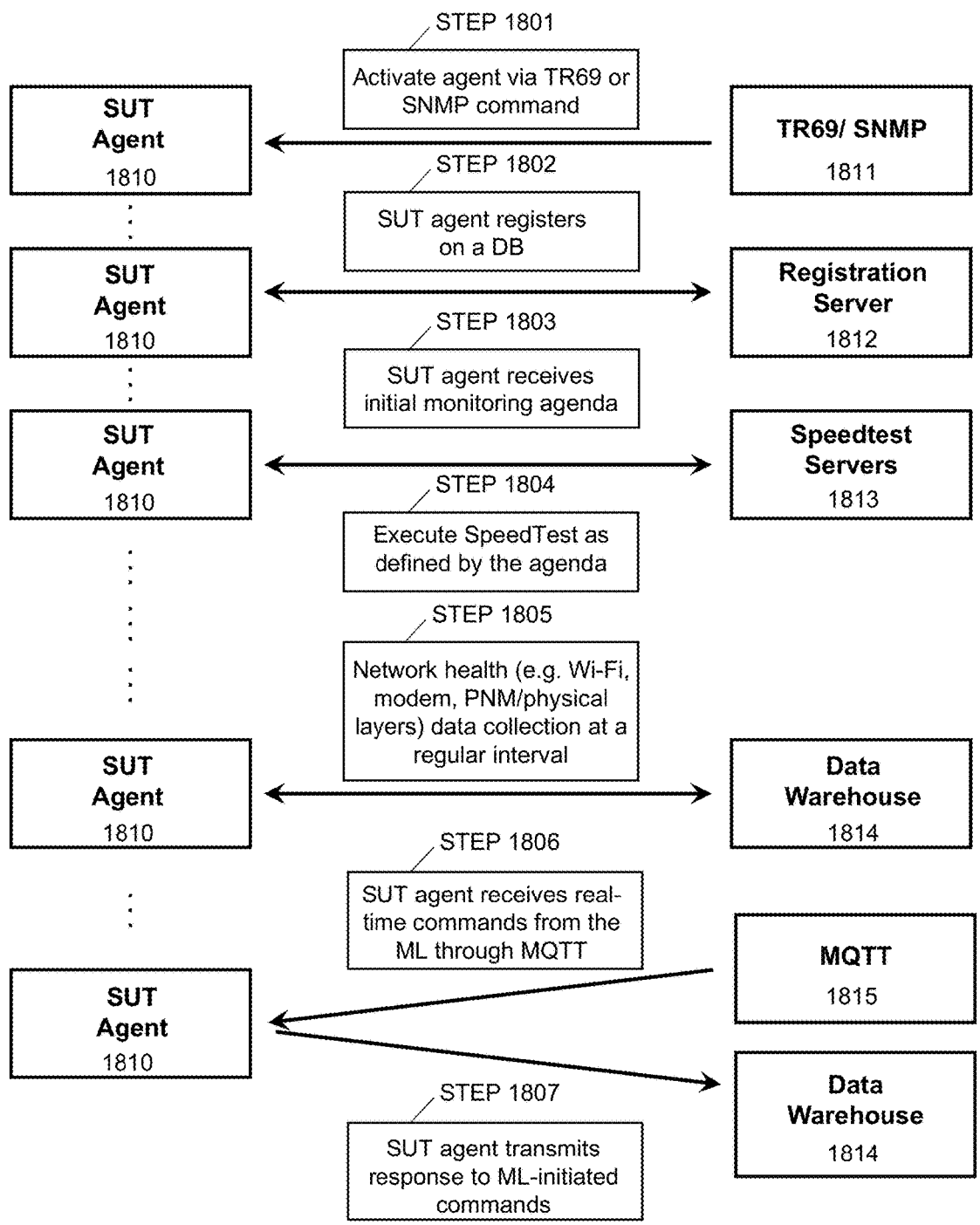
FIG. 18 shows an activation and data collection process for the machine learning-based network analytics, troubleshoot, and self-healing holistic telemetry system incorporating modem-embedded machine analysis of multi-protocol stacks, in accordance with an embodiment of the invention.

FIG. 18 shows an activation and data collection process (1800) for the machine learning-based network analytics, troubleshoot, and self-healing holistic telemetry system incorporating modem-embedded machine analysis of multi-protocol stacks, in accordance with an embodiment of the invention. As illustrated in this process (1800), the holistic telemetry system incorporates one or more SUT agents (1810) embedded in modems and other network equipment in a data network that requires monitoring and diagnosis. The holistic telemetry system also comprises a TR69/SNMP server (1811), a registration server (1812), a speed test server (1813), a data warehouse (1814), and an MQTT brokering server (1815), all of which are operatively connected to a machine-learning (ML) module executed by the holistic telemetry system.

In the preferred embodiment of the invention, the TR69/SNMP server (1811) is configured to control activation process and device on/off features for each SUT agent (1810). For example, the TR69/SNMP server can activate an SUT agent via TR69 or SNMP commands, as shown in STEP 1801. The registration server (1812) accommodates device registration of each SUT agent (1810) to a database connected to the holistic telemetry system, as shown in STEP 1802, and then transmits an initial command agenda to each SUT agent (1810), as shown in STEP 1803.

Subsequently, each SUT agent (1810) and the ML module executed by the holistic telemetry system are engaged in bidirectional, real-time, and/or on-demand communications using the speed test server (1813), the data warehouse (1814), and/or the MQTT brokering server (1815) to conduct various network diagnostic activities. For example, as shown in STEP 1804, a speed test between a particular SUT agent (e.g. 1810) and the speed test server (1813) may be executed as defined by the initial monitoring agenda or amendments to the initial monitoring agenda. In another example, the particular SUT agent (e.g. 1810) may transmit network health (e.g. Wi-Fi, modem, PNM/physical layers, etc.) data collection at a predefined time interval to the data warehouse (1814) connected to the ML module of the holistic telemetry system, as shown in STEP 1805. The ML module is able to send real-time commands to a particular SUT agent as needed to retrieve various pieces of network diagnostics information associated with the entire OSI stack to enable the modem-embedded machine analysis of multi-protocol stacks in the ML module. In some cases, the particular SUT agent may voluntarily flag a troublesome performance parameter first and transmit related information to the ML module.

As shown in STEP 1806 of the activation and data collection process (1800) for the machine learning-based network analytics, troubleshoot, and self-healing holistic telemetry system, each SUT agent (1810) is configured to receive real-time commands from the ML module through the MQTT brokering server (1815). Upon receiving the real-time commands from the ML module, each SUT agent (1810) transmits a response, which typically incorporates network health information, to the data warehouse connected to the ML module of the holistic telemetry system, as shown in STEP 1807.

Various embodiments of the present invention provide several key advantages in data network problem discovery and repair processing. One advantage of an embodiment of the present invention is providing a novel electronic system for identifying and locating sources or causes of data network problems autonomously within an entire end-to-end network topology of a network operator, while not necessitating human diagnosis of the data network problems.

Moreover, another advantage of an embodiment of the present invention is providing a novel electronic system and a related operating method capable of monitoring and evaluating potential data network service quality problems holistically with just one integrated diagnostic system by performing modem-embedded machine analysis of multi-protocol (e.g. OSI layer) stacks simultaneously. This novel integrated diagnostic system that monitors all layers of a data network simultaneously enables faster and more efficient and accurate discoveries and solutions to customers' quality of experience (QoE) problems, compared to disparate or discrete conventional diagnostic tools deployed on different OSI layers.

In addition, another advantage of an embodiment of the present invention is providing a novel electronic system that autonomously heals data network-related problems within an entire end-to-end network topology of a network operator, whenever situations merit software-based automated network repairs.

Furthermore, another advantage of an embodiment of the present invention is providing a novel electronic system that autonomously generates trouble tickets for physical repairs without human diagnostic interventions, wherein each trouble ticket pinpoints problems and identifies problem locations autonomously by utilizing a machine-learning diagnostic tool that monitors an entire end-to-end network topology of a network operator, including individual end-user modems.

Yet another advantage of an embodiment of the present invention is providing a method for operating a novel electronic system for identifying, locating, and self-healing sources or causes of data network problems autonomously within an entire end-to-end network topology of a network operator, while not necessitating human diagnosis of the data network problems.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operating a machine learning-based network analytics, troubleshoot, and self-healing holistic telemetry system, the method comprising the steps of:

colleting end-user quality-of-experience (QoE) parameters from a modem-embedded smart universal telemetry (SUT) module executed with a modem device firmware in an end-user modem, wherein the end-user modem is a service provider's on-premise network equipment that further connects to end users' personal and mobile computing devices;

collecting broadband diagnostic datasets from a broadband measurement server;

collecting wireless local area network (LAN)-related diagnostic datasets from a wireless LAN measurement server, wherein each of the modem-embedded SUT module, the broadband measurement server, and the wireless LAN measurement server is connected to an operator's wide-area data network, and wherein the end-user QoE parameters, the broadband diagnostic datasets, and the wireless LAN-related diagnostic datasets comprise a complete snapshot of multi-protocol stack diagnostic information;

converting the end-user QoE parameters, broadband diagnostic datasets, and wireless LAN-related diagnostic datasets into an input features format compatible to a machine learning (ML)-based artificial intelligence (AI) analytical module;

synthesizing the input features format further to include a customer profile, a network topology for the operator's wide-area data network, and additional information associated with network equipment in the operator's wide-area data network;

feeding the input features format into the machine learning (ML)-based artificial intelligence (AI) analytical module executed in a cloud-computing resource connected to the operator's wide-area data network;

identifying and locating a network QoE problem from the machine learning (ML)-based artificial intelligence (AI) analytical module;

calculating a QoE problem score by categorizing traits, origins, and characteristics of the network QoE problem into three particular performance parameters comprising a total number of impacted key performance indicators (KPIs), severity of the network QoE problem, and frequency of the network QoE problem, wherein the impacted KPIs integrate download, upload, latency, packet loss, and jitter measurements from the modem-embedded SUT module to the operator's wide-area data network; and generating and displaying a resolution strategy autonomously from the machine learning (ML)-based artificial intelligence (AI) analytical module and resolving the network QoE problem within the operator's wide-area data network.

2. The method of claim 1, wherein the complete snapshot of multi-protocol stack diagnostic information comprises periodic or real-time diagnostic information from a physical layer, a link layer, a network layer, a transport layer, and an application layer associated with the operator's wide-area data network.

3. The method of claim 1, wherein the step of colleting end-user QoE parameters from the modem-embedded SUT module utilizes a Technical Report 069 Protocol (TR69) and simple network management protocol (SNMP) server for activation of the modem-embedded SUT module in the end-user modem.

4. The method of claim 1, wherein the step of colleting end-user QoE parameters from the modem-embedded SUT module utilizes a registration server to register the modem-embedded SUT module, and an MQ telemetry transport (MQTT) brokering server to transmit and receive bidirectional commands between the modem-embedded SUT module in the end-user modem and the machine learning (ML)-based artificial intelligence (AI) analytical module.

5. The method of claim 1, wherein the step of generating the resolution strategy autonomously from the machine learning (ML)-based artificial intelligence (AI) analytical module involves creating a trouble ticket that pinpoints a source device and a source location of the network QoE problem without any human operator intervention, and wherein the trouble ticket is subsequently transmitted to a network repair technician to perform an onsite network equipment repair for the operator's wide-area data network.

6. The method of claim 1, further comprising a step of executing an autonomous machine-initiated self-healing of the network QoE problem from the machine learning (ML)-based artificial intelligence (AI) analytical module via a software modification to a network equipment causing the network QoE problem.

7. The method of claim 1, further comprising a step of evaluating effectiveness of the resolution strategy by calculating and comparing resolution metrics.

8. The method of claim 7, further comprising a step of refining and improving the effectiveness of the resolution strategy based on an adaptive machine learning feedback loop provided by multiple iterations of operating the machine learning-based network analytics, troubleshoot, and self-healing holistic telemetry system.

* * * * *